US006063320A

United States Patent [19]

Horikawa

[11] Patent Number: 6,063,320

[45] Date of Patent: May 16, 2000

[54] APPARATUS FOR AND PROCESS OF HOT PRESSING BOARDS

[75] Inventor: Mitsumasa Horikawa, Toyohashi, Japan

[73] Assignee: Koyo Sangyo Co., Ltd., Japan

[21] Appl. No.: 09/157,224

[22] Filed: Sep. 18, 1998

Related U.S. Application Data

[63] Continuation of application No. 08/698,961, Aug. 16, 1996, abandoned.

[30] Foreign Application Priority Data

Aug. 22, 1995 [JP] Japan .................................... 7-213690

[51] Int. Cl.[7] ................................................ B29C 43/34

[52] U.S. Cl. ........................ 264/297.4; 264/322; 264/334; 425/186; 425/193

[58] Field of Search .................................... 264/322, 334, 264/319, 297.4; 425/186, 193; 156/580

[56] References Cited

U.S. PATENT DOCUMENTS

| | | | |
|---|---|---|---|
| Re. 30,759 | 10/1981 | Burkner | 264/118 |
| 3,977,535 | 8/1976 | Husges et al. . | |
| 4,065,003 | 12/1977 | Hostettler . | |
| 4,253,891 | 3/1981 | Brussel . | |
| 4,424,092 | 1/1984 | Salenz . | |
| 4,479,841 | 10/1984 | Rapp et al. . | |
| 5,477,901 | 12/1995 | Schikarski et al. . | |
| 5,597,521 | 1/1997 | Wickham . | |

FOREIGN PATENT DOCUMENTS

| | | |
|---|---|---|
| 0 322 144 | 6/1989 | European Pat. Off. . |
| 2 289 329 | 10/1975 | France . |
| 9300454 | 10/1994 | Netherlands . |
| 404 952 | 7/1966 | Switzerland . |
| WO88/02301 | 4/1988 | WIPO . |

*Primary Examiner*—Jan H. Silbaugh
*Assistant Examiner*—Mark Eashoo
*Attorney, Agent, or Firm*—Douglas J. Christensen

[57] ABSTRACT

An apparatus for hot pressing boards comprises a conveying and setting mechanism for setting a board put on a caul plate in a predetermined hot pressing position, and a hot pressing mechanism including a hot plate and a spacer, the board being hot pressed in a closed space defined by the hot plate, the caul plate and the spacer. The conveying and setting mechanism includes a conveying member for supporting the caul plate in a state free from frictional contact with any other member while the caul plate is conveyed to a hot pressing section, and a setting member for supporting the caul plate in succession to the conveying member and setting the caul plate in the hot pressing position, the setting member being retreated to a position free from interference with hot pressing operation after the setting of the caul plate in the hot pressing position.

10 Claims, 24 Drawing Sheets

APPARATUS FOR AND PROCESS OF HOT PRESSING BOARDS

This application is a continuation application of U.S. application Ser. No. 08/698,961, filed Aug. 16, 1996, now abandoned.

BACKGROUND OF THE INVENTION

1. Field of the Invention

This invention relates to a technique of hot pressing boards in wood working.

Throughout the specification, by the term "board" are meant wooden boards such as laminated wooden boards, aggregated boards, fiber boards, wafer boards, and particle boards, and also laminate boards made of such plants as kaoliang, and by the term "hot pressing" is meant a process of pressing the work while heating the same.

2. Description of the Prior Art

FIGS. 25 to 27 show a well-known technique for hot pressing boards. As shown in FIGS. 25 and 26, a board 12 as a work is put on a caul plate 20, which is then conveyed by a conveying mechanism 40, for instance, a pusher, to a hot pressing section 31.

The caul plate 20 is moved horizontally as it is conveyed by the conveying mechanism 40, and is set in a predetermined hot pressing position in a hot pressing section 31. Above the hot pressing section 31, a hot pressing mechanism 30 is disposed, which is constituted by a hot plate 32 and a spacer 33.

As shown in FIGS. 26 and 27, in the hot pressing section 31, the board 12 put on the caul plate 20 is pressed by the hot plate 32 of the hot pressing mechanism 30. The hot plate 32 has been preliminarily heated, and the board 12 can receive heat therefrom and is thus hot pressed.

As for the extent of pressing the board 12 to obtain a given thickness thereof, with the pressing of the board 12, the spacer 33 which is configured to project from the hot plate 32, is brought into contact with the caul plate 20, and thus serves as stopper to determine the extent of pressing.

As shown in FIG. 27, a hot pressing region in which the board 12 is pressed, is a closed space 36 defined by the hot plate 32, the spacer 33 and the caul plate 20.

The spacer 33 has steam supply ports 35 formed therethrough. While the board 12 is pressed, steam is supplied to the closed space 36 through the steam supply ports 35 for perfect hot pressing of the board 12. The steam supplied can maintain a high pressure in the closed space 36, and therefore can be readily impregnated into the board 12.

In the above prior art technique of hot pressing boards, however, the board 12 put on the caul plate 20 is conveyed to the hot pressing section 31 by the conveying mechanism 40, and the caul plate 20 is moved horizontally as it is conveyed by the conveying mechanism 40 to be set in a hot pressing position. This means that the caul plate 20 may be in frictional contact with other members to result in its wear or deformation. In addition, various parts or members constituting the hot pressing section 31, with which the caul plate 20 is in frictional contact, may be worn out or deformed.

The wear or deformation of the caul plate 20 and various parts or members constituting the hot pressing section 31, disables formation of the closed space 36 by the hot plate 32, spacer 33 and caul plate 20 when hot pressing the board 12. In other words, the wear or deformation results in the formation of a clearance between the caul plate 20 and the spacer 33, and heat or steam supplied at the time of hot pressing may leak out through the clearance.

Such leakage of heat or steam reduces the temperature or steam pressure in the closed space 36, thus reducing the efficiency of hot pressing.

SUMMARY OF THE INVENTION

In view of the above problem, the invention seeks to provide an apparatus for and a process of hot pressing boards which can effectively prevent the decrease in efficiency of hot pressing boards by preventing wear or deformation of a caul plate during conveying of a board.

This object of the invention is attained as follows.

A first aspect of the invention provides an apparatus for hot pressing boards, which comprises a caul plate for supporting a board put thereon, a conveying and setting mechanism for conveying the board supported on the caul plate to a hot pressing section and setting the board in a predetermined hot pressing position in the hot pressing section, and a hot pressing mechanism for hot pressing the board set in the hot pressing position, the hot pressing mechanism including a hot plate for hot pressing the board set in the hot pressing position, and a spacer configured to project from the hot plate and capable of adjusting the extent of pressing the board, the board being hot pressed in a closed space defined by the hot plate, the caul plate and the spacer, the conveying and setting mechanism being able to be advanced and retreated between the hot pressing section and the outside thereof, support the caul plate in a state free from frictional contact with any other member while the caul plate is conveyed to the hot pressing section, set the caul plate in a predetermined hot pressing position in the hot pressing section, and be retreated to a position free from interference with the hot pressing operation after the setting of the caul plate in the hot pressing position.

According to the first aspect of the invention, the board is put on the caul plate to be conveyed to the hot pressing section and is set in the predetermined hot pressing position therein by the conveying and setting mechanism. In the hot pressing position, the board is hot pressed by the hot pressing mechanism. The hot pressing mechanism has the hot plate for hot pressing the board and the spacer configured to project from the hot plate, and the board is hot pressed in the closed space defined by the hot plate, the caul plate and the spacer. Since the conveying and setting mechanism can cause the caul plate to be conveyed to the hot pressing section and set in the predetermined hot pressing position in a state free from frictional contact with any other member, it is possible to effectively prevent wear or deformation of the caul plate due to frictional contact thereof with other members.

Thus, the space defined by the hot plate, the spacer and the caul plate, which is prevented from wear or deformation, is always held closed while the board is hot pressed, thus effectively preventing the decrease in efficiency of hot pressing of boards.

Preferably, the conveying and setting mechanism includes a conveying member capable of being advanced and retreated between the hot pressing section and the outside thereof, and supporting the caul plate in a state free from frictional contact with any other member while the caul plate is conveyed to the hot pressing section, and a setting member for supporting the caul plate in succession to the conveying member in the hot pressing section, and setting the caul plate in the hot pressing position after the conveying member has been retreated to a position free from interference with hot pressing operation, the setting member being retreated to a position free from interference with the hot pressing operation after the setting of the caul plate in the hot pressing position.

Preferably, the conveying member has rails for supporting the caul plate thereabove in a state free from frictional contact with any other member, and a drive mechanism for causing advancement and retreat of the rails between the hot pressing section and the outside thereof, and the setting member can release the caul plate from the rails in the hot pressing section by raising the caul plate from the rails, set the caul plate in the hot pressing position in the hot pressing section by lowering the caul plate after the rails without any supported caul plate has been retreated by the drive mechanism to a position free from interference with the hot pressing operation, and be retreated to a position free from interference with the hot pressing operation after the setting of the caul plate in the hot pressing position.

Thus, the caul plate with the board supported therein is supported above the conveying member, which has the rails and the drive mechanism, to be conveyed to the hot pressing section in a state free from frictional contact with any other member. In the hot pressing section, the setting member releases the caul plate from the rails by raising the caul plate. After the rails no longer with any supported caul plate has been retreated by the drive mechanism to a position free from interference with hot pressing operation, the setting member causes the caul plate to be lowered and set in the predetermined hot pressing position in the hot pressing section. The rails permit the caul plate to be conveyed to the hot pressing section and set in the predetermined hot pressing position in a state free from frictional contact with any other member. It is thus possible to effectively prevent the caul plate from wear or deformation due to frictional contact with other members.

Preferably, the foregoing apparatus further comprises a board take-out mechanism capable of being advanced and retreated between the hot pressing section and the outside thereof and, after the board has been hot pressed, supporting the caul plate in succession to the setting member, thereby feeding the caul plate to the outside of the hot pressing section without frictional contact with any other member.

Thus, the caul plate supporting the board having been hot pressed, is supported by the setting member in the hot pressing section. The caul plate is then supported by the board take-out mechanism which can be advanced and retreated between the hot pressing section and the outside thereof, in succession to the setting member, and is taken out from the hot pressing section. During this time, the caul plate is fed to the outside of the hot pressing section in a state free from frictional contact with any other member by the board take-out mechanism. It is thus possible to effectively prevent, when taking out the board as well, wear or deformation of the caul plate due to frictional contact with other members.

In the foregoing apparatus, a plurality of the hot pressing mechanisms and the conveying and setting mechanisms are disposed in a multiple stage arrangement to permit hot pressing of a plurality of boards at a time. It is thus possible to provide greatly improved efficiency of hot pressing.

Further, in the foregoing apparatus, the board or each of the boards is hot pressed by the hot plate in a heated state thereof and by steam or gas supplied to the closed space defined by the hot plate, the caul plate and the spacer.

Thus, the board is hot pressed by the hot plate in a heated state thereof and by steam or gas supplied to the closed space defined by the hot plate, the spacer and the caul plate which is effectively prevented from deformation. It is thus difficult for heat in the closed space to escape to the outside, thus further improving hot pressing efficiency.

A second aspect of the invention provides a process of hot pressing boards, which comprises the steps of putting a board on a caul plate, causing the board put on the caul plate to be conveyed to a hot pressing section and set in a predetermined hot pressing position therein, and hot pressing the board in the hot pressing section with a hot pressing mechanism, the hot pressing mechanism including a hot plate for hot pressing the board in the hot pressing position, and a spacer configured to project from the hot plate and capable of adjusting the extent of pressing the board, the board being hot pressed in a closed space defined by the hot plate, the caul plate and the spacer, the caul plate in the board conveying step being supported in a state free from frictional contact with any other member by a conveying and setting mechanism capable of being advanced and retreated between the hot pressing section and the outside thereof to be conveyed to the hot pressing section, and set in the hot pressing position in the hot pressing section by the conveying and setting mechanism, the board being thereby hot pressed after the retreat of the conveying and setting mechanism to a position free from interference with the hot pressing operation.

According to the second aspect of the invention, the board is first put on the caul plate, and in the conveying and setting step, it is conveyed to the hot pressing section and is set in the predetermined hot pressing position therein. It is then hot pressed in the hot pressing position by the hot pressing mechanism.

Since, in the conveying and setting step, the caul plate is conveyed to the hot pressing section and is set in the predetermined hot pressing position in a state free from frictional contact with any other member, it is possible to effectively prevent wear or deformation of the caul plate in frictional contact with other members. This means that the space defined by the hot plate, the spacer and the caul plate which is effectively prevented from deformation, is always held closed while the board is hot pressed. It is thus possible to effectively prevent the decrease in the efficiency of hot pressing boards.

Preferably, the conveying and setting mechanism includes a conveying member and a setting member. The caul plate in the board conveying step is supported in a state free from frictional contact with any other member by the conveying member capable of being advanced and retreated between the hot pressing section and the outside thereof to be conveyed to the hot pressing section, supported by the setting member in succession to the conveying member in the hot pressing section, and set in the hot pressing position in the hot pressing section by the setting member after the conveying member has been retreated to a position free from interference with hot pressing operation, the board being hot pressed after the setting member has been retreated to a position free form interference with the hot pressing operation.

Preferably, the conveying member has rails for supporting the caul plate thereabove in a state free from frictional contact with any other member, and a drive mechanism for causing advancement and retreat of the rails between the hot pressing section and the outside thereof, and the setting member can release the caul plate from the rails in the hot pressing section by raising the caul plate from the rails, set the caul plate in the hot pressing position in the hot pressing section by lowering the caul plate after the rails without any supported caul plate has been retreated by the drive mechanism to a position free from interference with the hot pressing operation, and be retreated to a position free from interference with the hot pressing operation after the setting of the caul plate in the hot pressing position.

Thus, the caul plate with the board put thereon is supported above the conveying member having the rails and the drive mechanism to be conveyed to the hot pressing section in a state free from frictional interference with any other member. In the hot pressing section, the setting member releases the caul plate from the rails by raising the caul plate.

After the rails without caul plate thereon any more has been retreated to a position free from interference with hot pressing operation, the setting member causes the caul plate to be lowered and set in the predetermined hot pressing position in the hot pressing section.

The rails permit the caul plate to be conveyed to the hot pressing section and set in the predetermined hot pressing position therein in a state free from frictional contact with any other member. It is thus possible to effectively prevent wear or deformation of the caul plate due to frictional contact with other members.

Further, in the foregoing process, the caul plate supporting the board having been pressed is supported by the setting member in the hot pressing section, and is subsequently supported by a board take-out mechanism capable of being advanced and retreated between the hot pressing section and the outside thereof in succession to the setting member to be conveyed in a state free from frictional contact with any other member to the outside of the hot pressing section.

Preferably, in the foregoing process, a plurality of the hot pressing mechanisms are disposed in a multiple stage arrangement, and a plurality of boards are conveyed to and hot pressed in hot pressing sections at a time. It is thus possible to greatly improve the hot pressing efficiency.

Thus, the caul plate supporting the board having been hot pressed is supported by the setting member in the hot pressing section. Subsequently, it is supported by the board take-out mechanism capable of being advanced and retreated between the hot pressing section and the outside thereof in succession to the setting member. The board take-out mechanism feeds the caul plate to the outside of the hot pressing section in a state free from frictional contact with any other member. Thus, when taking out the board, it is again possible to effectively prevent wear or deformation of the caul plate due to frictional contact with other members.

As described above, according to the invention an apparatus for and a process of hot pressing boards are provided, which can effectively prevent decrease in hot pressing efficiency in the hot pressing of boards by preventing wear or deformation of the caul plate.

The present invention will be more fully understood from the following detailed description and appended claims when taken with reference to the accompanying drawings.

DETAILED DESCRIPTION OF THE PREFERRED EMBODIMENTS

Preferred embodiments of the invention will now be described with reference to the drawings.

In the first place, the basic hot pressing process will be described.

Figure 1:
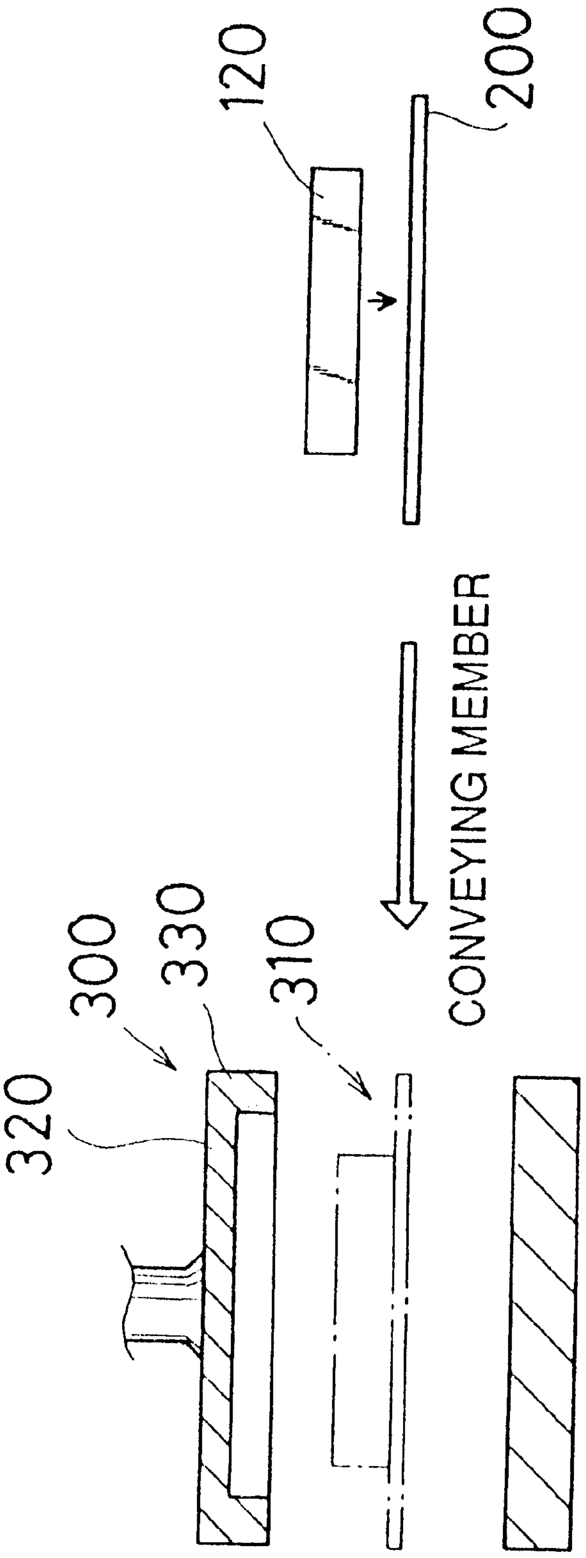
FIG. 1 is a view illustrating a hot pressing process according to an embodiment of the invention.

As shown in FIG. 1, a board 120 is put on a caul plate 200 and conveyed by a conveying member in a conveying and setting mechanism to a hot pressing section 310. The conveying member will be described later in detail.

In the hot pressing section 310, a hot pressing mechanism 300 for hot pressing the board 120 is provided. The hot pressing mechanism 300 has a hot plate 320 and a spacer 330 projecting from the edge of the hot plate 320 toward the hot pressing section 310.

The hot plate 320 has been preliminarily heated to heat the board while pressing the same in a hot pressing operation to be described later. The heating temperature of the hot plate 320 can be suitably selected in dependence on the kind of the board or the like. In this embodiment, the heating temperature is set in a range of 50 to 250° C.

Figure 2:
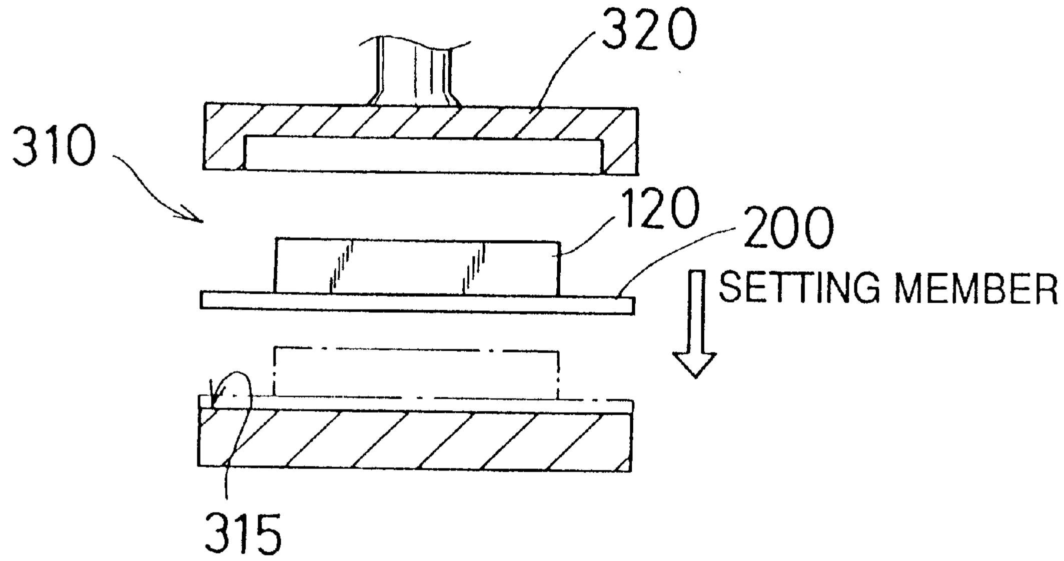
FIG. 2 is a view also illustrating the hot pressing process according to the embodiment of the invention.

As shown in FIG. 2, the caul plate 200 with the board 120 put thereon is supported by a setting member in the conveying and setting mechanism in succession to the conveying member and is set in a predetermined hot pressing position 315. The setting member will be described later in detail.

Figure 3:
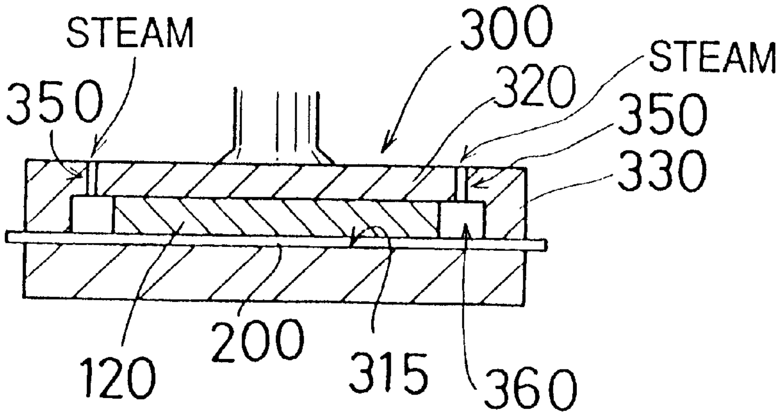
FIG. 3 is a view further illustrating the hot pressing process according to the embodiment of the invention.

As shown in FIG. 3, the board 120 that has been set in the hot pressing position 315, is hot pressed in such a manner as to be clamped between the hot pressing mechanism 300 and the caul plate 200.

The extent of pressing of the board 120 by the hot plate 320 at this time is determined by the spacer 330. The board 120 is hot pressed in a closed space 360 defined by the hot plate 320, the spacer 330 and the caul plate 200.

The extent of pressing by the hot plate can be selected as desired by taking into consideration the kind of the board and the density thereof after the hot pressing. In this embodiment, the board 120 is pressed such that a pressure of 2 to 30 kg/cm$^2$ is applied thereto.

Steam is supplied to the closed space 360 through steam supply ports 350 provided in the spacer 330. Preferably, the steam supplied has been pressurized, so that it can permeate into the board 120 to soften the board 120 and to fix the shape of the board 120.

In this embodiment, steam or gas that is used is under pressures of 1 to 10 kg/cm$^2$ and at temperatures of 50 to 450° C. The gas that is used may be inert gas such as $N_2$ gas and $CO_2$ gas.

Figure 4:
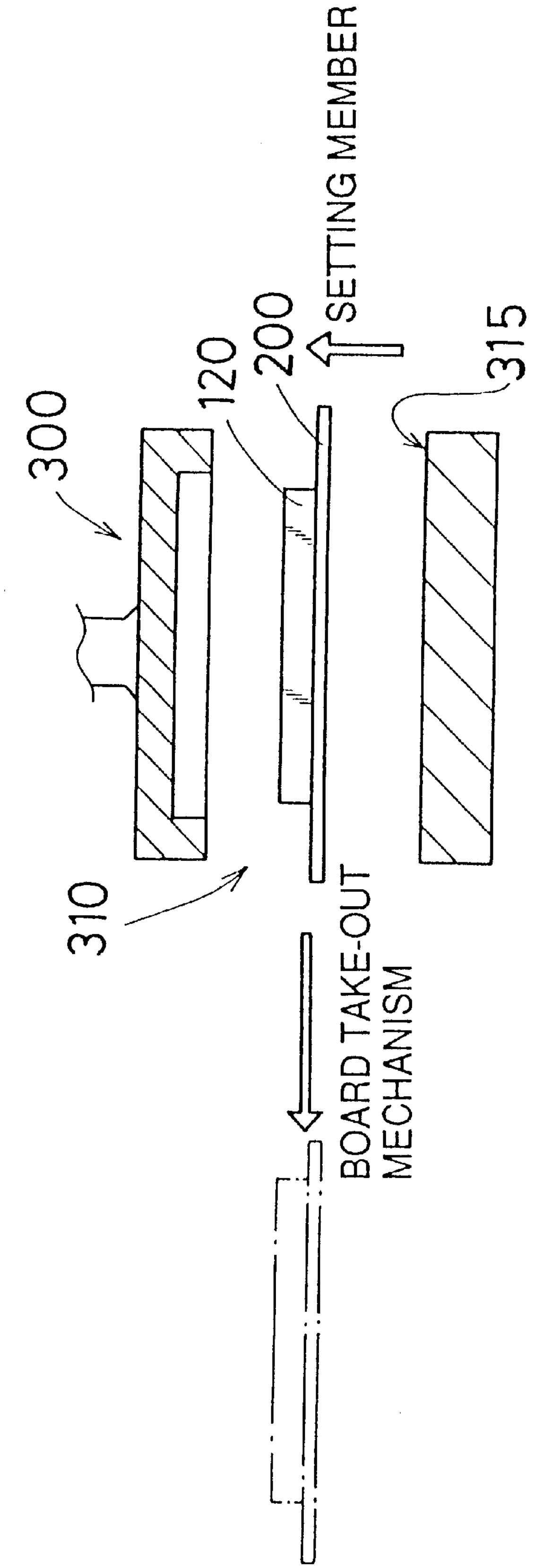
FIG. 4 is a view still further illustrating the hot pressing process according to the embodiment of the invention.

As shown in FIG. 4, after completion of the hot pressing by the hot pressing mechanism, the caul plate 200 with the board 120 placed thereon is supported again by the setting member in the hot pressing section 310, and is then supported by a board take-out mechanism in succession to the setting member to be conveyed to the outside of the hot pressing section 310, thus bringing an end to the hot pressing operation.

The conveying member and the setting member in the conveying and setting mechanism will now be described in detail.

Figure 5:
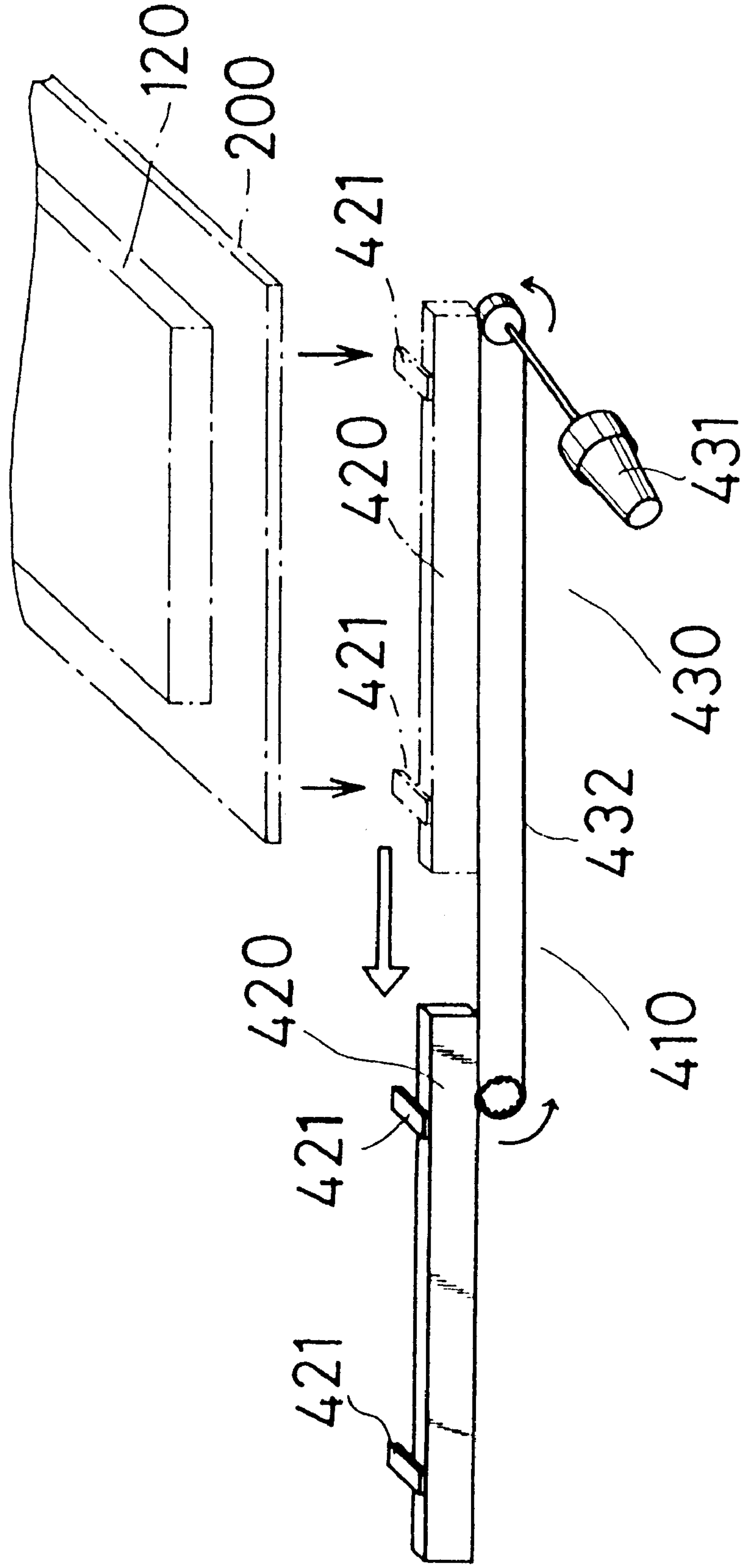
FIG. 5 is a view showing conveying member.

As shown in FIG. 5, the conveying member 410 has rails 420 for supporting the caul plate 200, with the board 120 placed thereon, via caul plate support members 421, and has a drive mechanism 430 for causing advancement and retreat of the rails 420 to the left and right as viewed in FIG. 5.

In this embodiment, the drive mechanism 430 has a motor 431 and a chain 432. It is possible to replace the drive mechanism 430 with other means for causing advancement and retreat of the rails 420, such as a rack-and-pinion mechanism and a cylinder.

Figure 6:
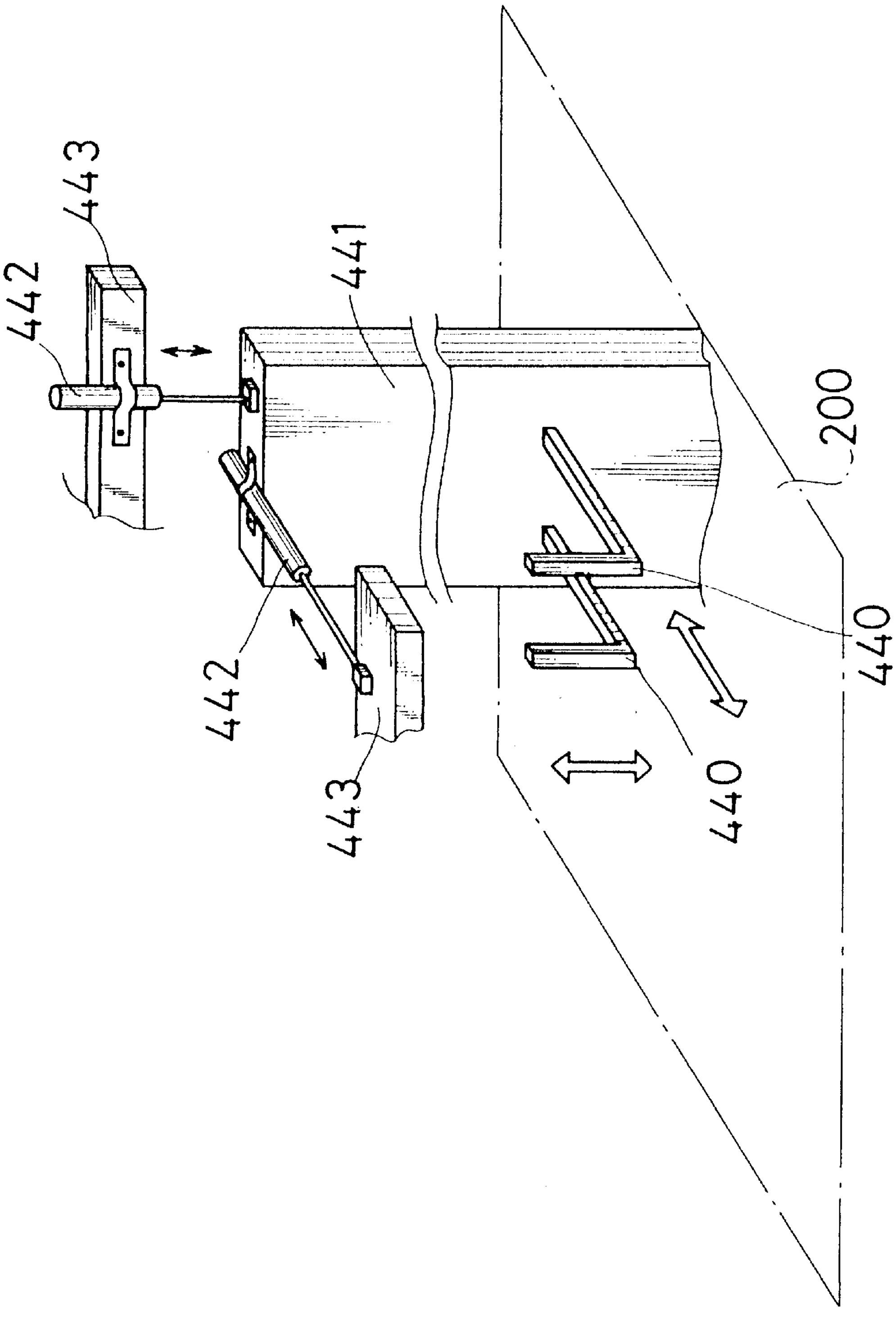
FIG. 6 is a view showing setting member.

As shown in FIG. 6, the setting member 440 support the caul plate 200 in succession to the conveying member 410. The setting member 440 is secured to a support 441 and is movable in vertical directions and also in back-and-forth directions by cylinders 442 secured to bases 443. The cylinders 442 may be replaced with other means for moving the setting member 440, for instance, a motor, a rack-and-pinion mechanism, a gear train, etc.

The conveying member 410 and the setting member 440 constitute the conveying and setting mechanism noted above.

Figure 7:
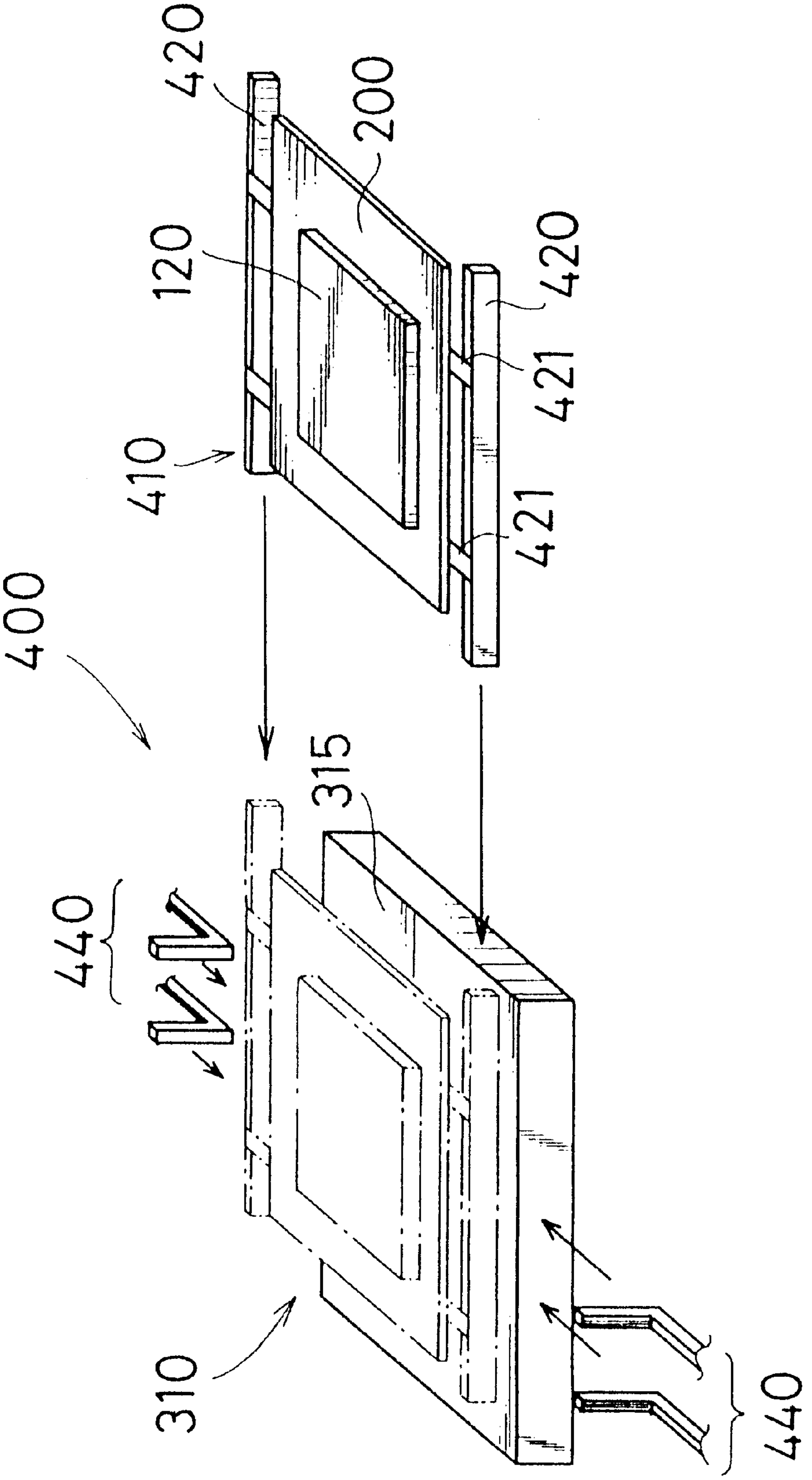
FIG. 7 is a view illustrating the operation of a conveying and setting mechanism.

The operations of the conveying and setting mechanism will now be described. As shown In FIG. 7, the caul plate 200 with the board 120 put thereon is conveyed by the conveying member 410 to the hot pressing section 310. The caul plate 200 is supported on the rails 420 via the caul plate support members 421 and is conveyed to the hot pressing section 310 in a state free from frictional contact with any other member.

The caul plate 200 is conveyed in a state that it is held aloft by an extent corresponding to the height of the rails 420 and that it is free from frictional contact with any other member except the caul plate support members 421 supporting the caul plate 200. Its wear is thus effectively prevented while it is conveyed to the hot pressing section 310.

The caul plate 200 having been conveyed to the hot pressing section 310 is supported by the setting member 440 in succession to the conveying member 410.

Figure 8:
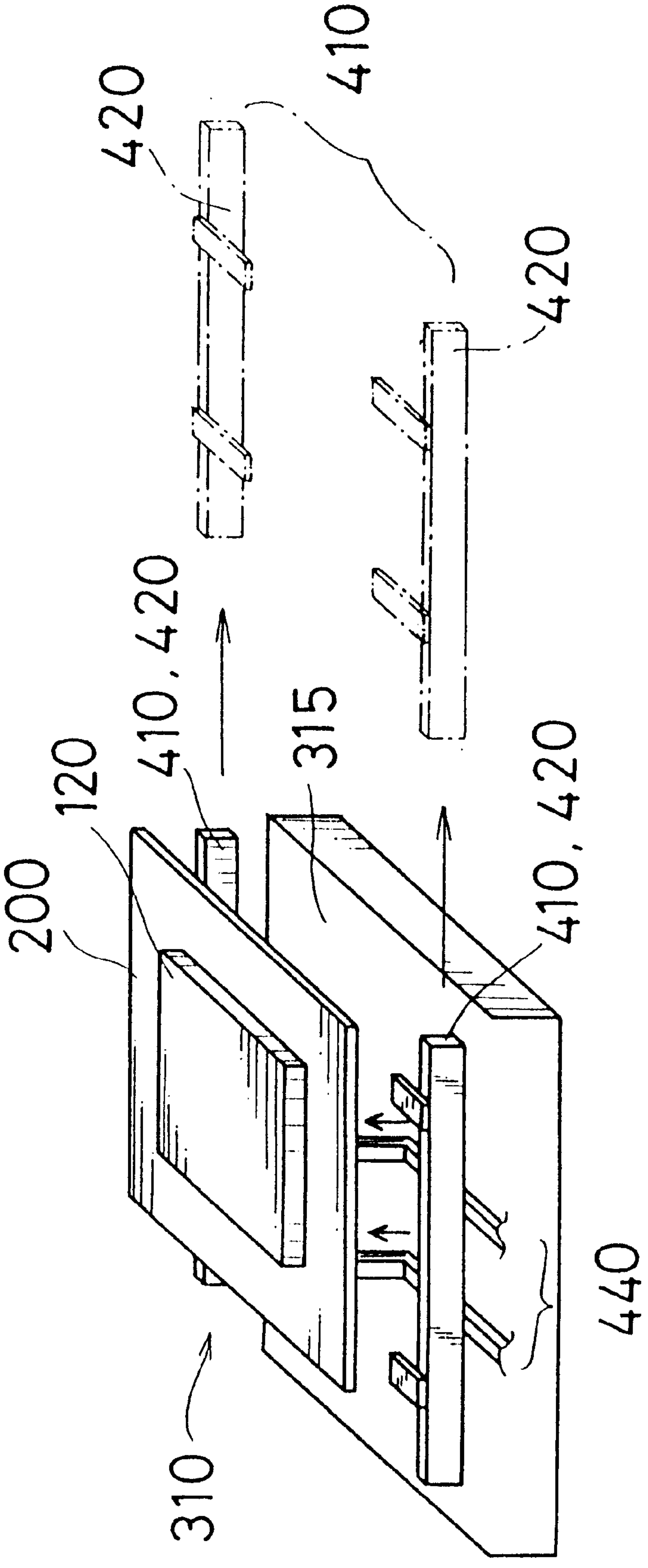
FIG. 8 is a view also illustrating the operation of the conveying and setting mechanism.

As shown in FIG. 8, the setting member 440 is moved toward the caul plate 200 with the board 120 put thereon, passes underneath the rails 420, and then supports and raises the caul plate 200. The setting member 440 is driven by the cylinders 442 as shown in FIG. 6. The caul plate 120 is thus released from support of the conveying member 410, which is then retreated by drive mechanism (see FIG. 5) to the outside of the hot pressing section 310.

Figure 9:
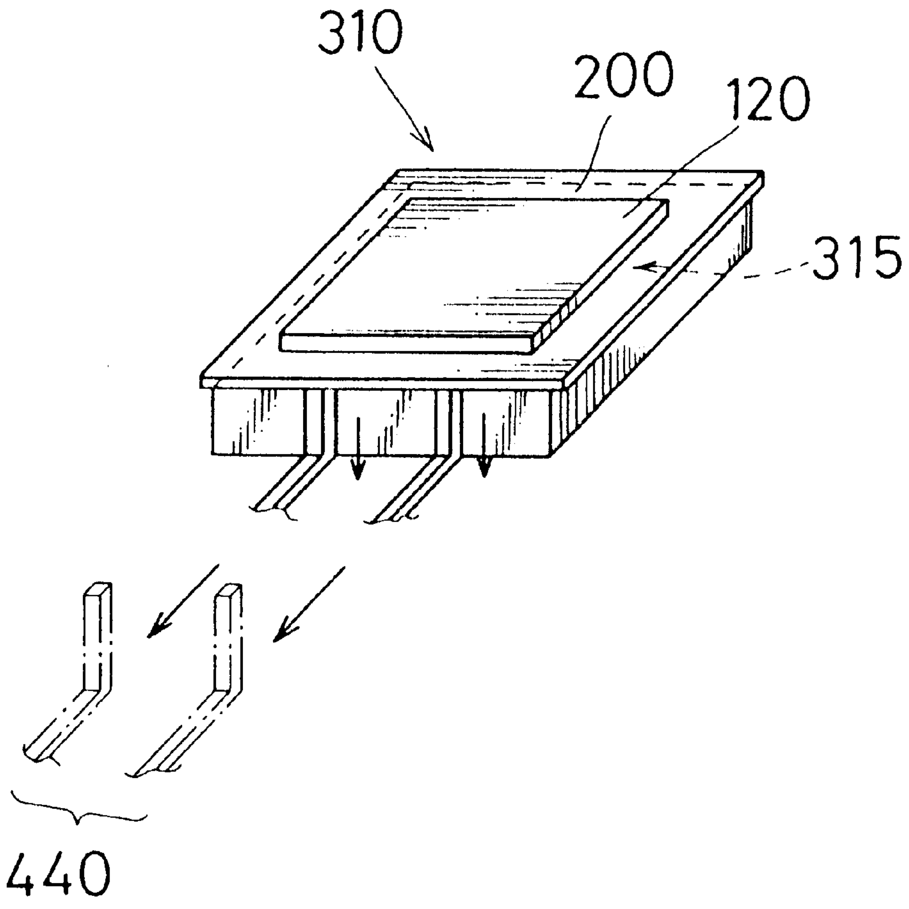
FIG. 9 is a view further illustrating the operation of the conveying and setting mechanism.

As shown in FIG. 9, the setting member 440 is then lowered to set the caul plate 200 in the predetermined hot pressing position 315. The setting member 440 is then retreated to a position free from interference with hot pressing operation. The setting member 440 is operated by the action of the cylinders 340 noted above and shown in FIG. 6.

In the above way, the caul plate 200 with the board 120 put thereon is set in the predetermined hot pressing position in the hot pressing section 310 for hot pressing by the hot pressing mechanism 300 noted above and shown in FIG. 3. The caul plate 200 is not moved from the hot pressing position 315 in frictional contact with any other member. It is thus possible to effectively prevent wear or deformation of the caul plate 200 and other parts in the hot pressing position 315.

A feature of the invention resides in that the caul plate is conveyed to and set in the hot pressing section by the conveying and setting mechanism in a state free from frictional contact with any other member. Other embodiments of the invention are thus possible in the scope of the above feature.

Figure 10:
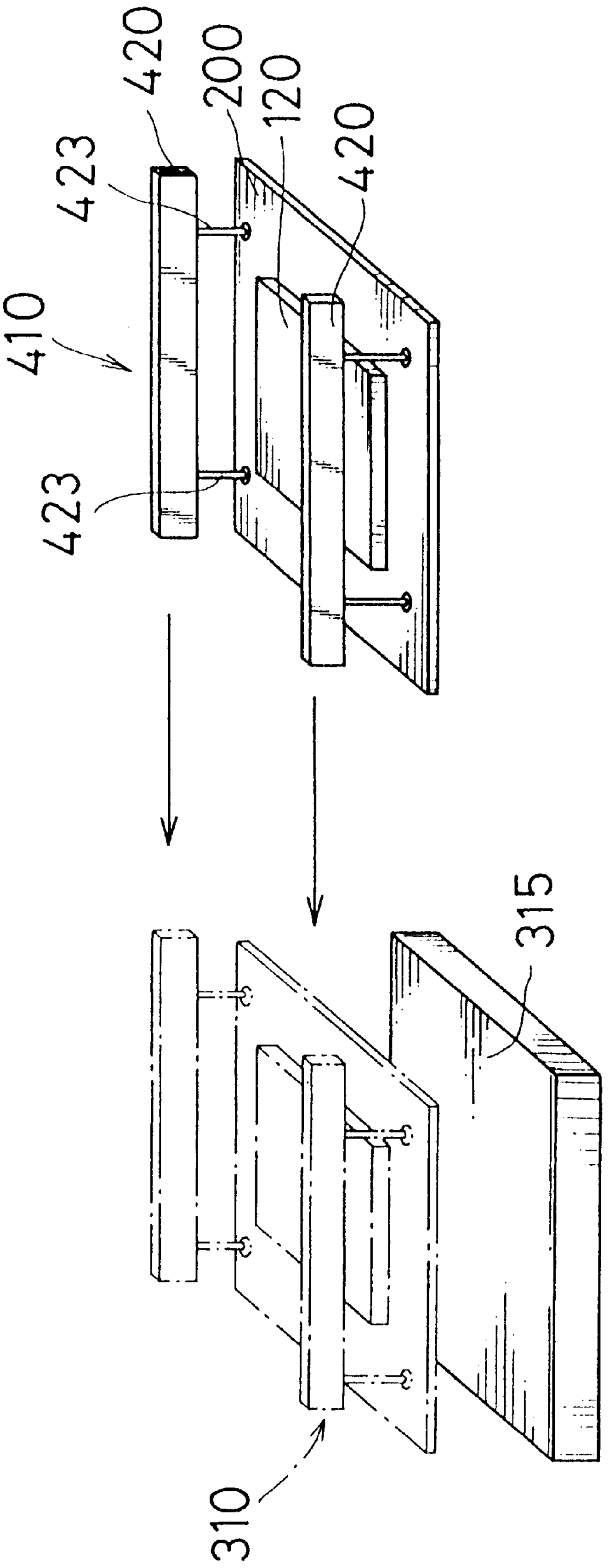
FIG. 10 is a view showing a different embodiment of the invention.

FIG. 10 shows a different embodiment of the invention. This embodiment is different from the preceding embodiment in the conveying member 410. Specifically, the caul plate 200 is suspended from the rails 420 via suspending members 423 as it is conveyed to the hot pressing section 310.

More specifically, this embodiment is the apparatus for hot pressing boards in which the conveying member has rails for suspending the caul plate in a state free from frictional contact with any other member and has a drive mechanism for causing advancement and retreat of the rails between the hot pressing section and the outside thereof, and the setting member can release the suspension of the caul plate by the rails in the hot pressing section, set the caul plate in the hot pressing position in the hot pressing section by lowering the caul plate after the rails with no suspended caul plate any more has been retreated by the drive mechanism to a position free from hot pressing operation, and be retreated to a position free from interference with the hot pressing operation after the setting of the caul plate in the hot pressing position.

Again in this case, the caul plate 200 is conveyed in a state free from frictional contact with any other member except that it is suspended by the suspending members 423, and thus it is possible to effectively prevent wear or the like of the caul plate 200 and various parts in the hot pressing section 310.

Figure 11:
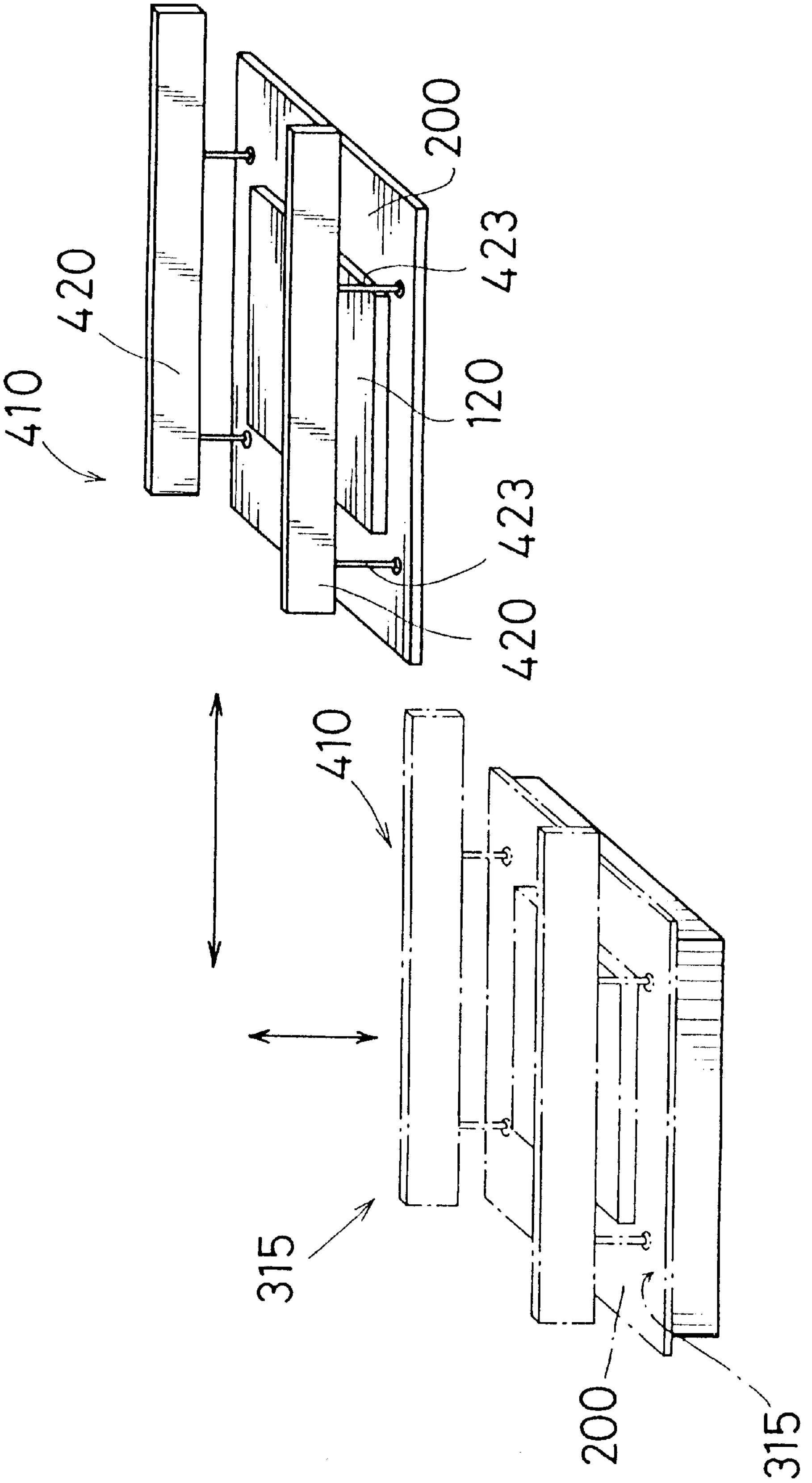
FIG. 11 is a view showing a further embodiment of the invention.

FIG. 11 shows another different embodiment of the invention, which will be described by also having reference to the preceding different embodiment shown in FIG. 10. As shown in FIG. 11, after the rails 420 suspending the caul plate 200 via the suspending members 423 have been conveyed to the hot pressing section 315, they are lowered to set the caul plate 200 in the predetermined hot pressing position 315.

After the setting of the caul plate 200 in the hot pressing position, the conveying member 410 is raised and conveyed to a position free from interference with the hot pressing operation.

This embodiment is of course applicable to a case of using the conveying member as shown in FIG. 7, in which the caul plate 200 is supported by the caul plate support members 421.

Figure 12:
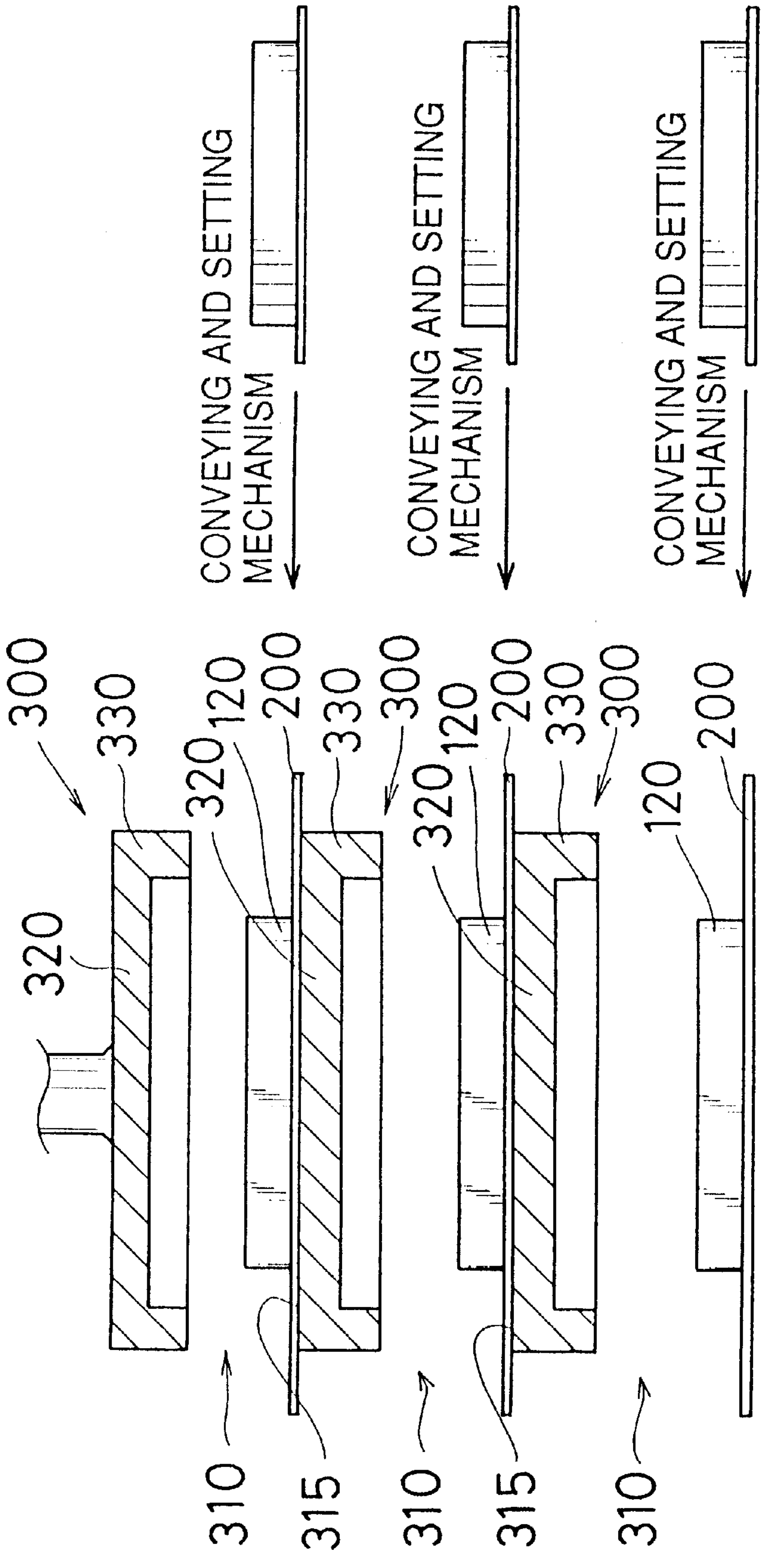
FIG. 12 is a view showing a still further embodiment of the invention.

FIG. 12 shows a further different embodiment of the invention. In this embodiment, a plurality of hot pressing mechanisms 300 are provided in a multiple stage disposition, and a plurality of caul plates 200 with respective boards 120 put thereon are conveyed to respective hot pressing sections 310 and are set in predetermined hot pressing positions therein at a time. In this case, the top of the hot plate 320 for processing a board 120 also serves the role of hot pressing position 315, in which a caul plate 200 with a different board 120 put thereon is to be set.

As practical embodiment of the invention which is particularly suitable as "an apparatus for and a process of hot pressing boards" according to the invention, a hot pressing apparatus which can hot press a plurality of boards at a time, will be described together with a hot pressing process using the same apparatus with reference to the drawings.

Figure 13:
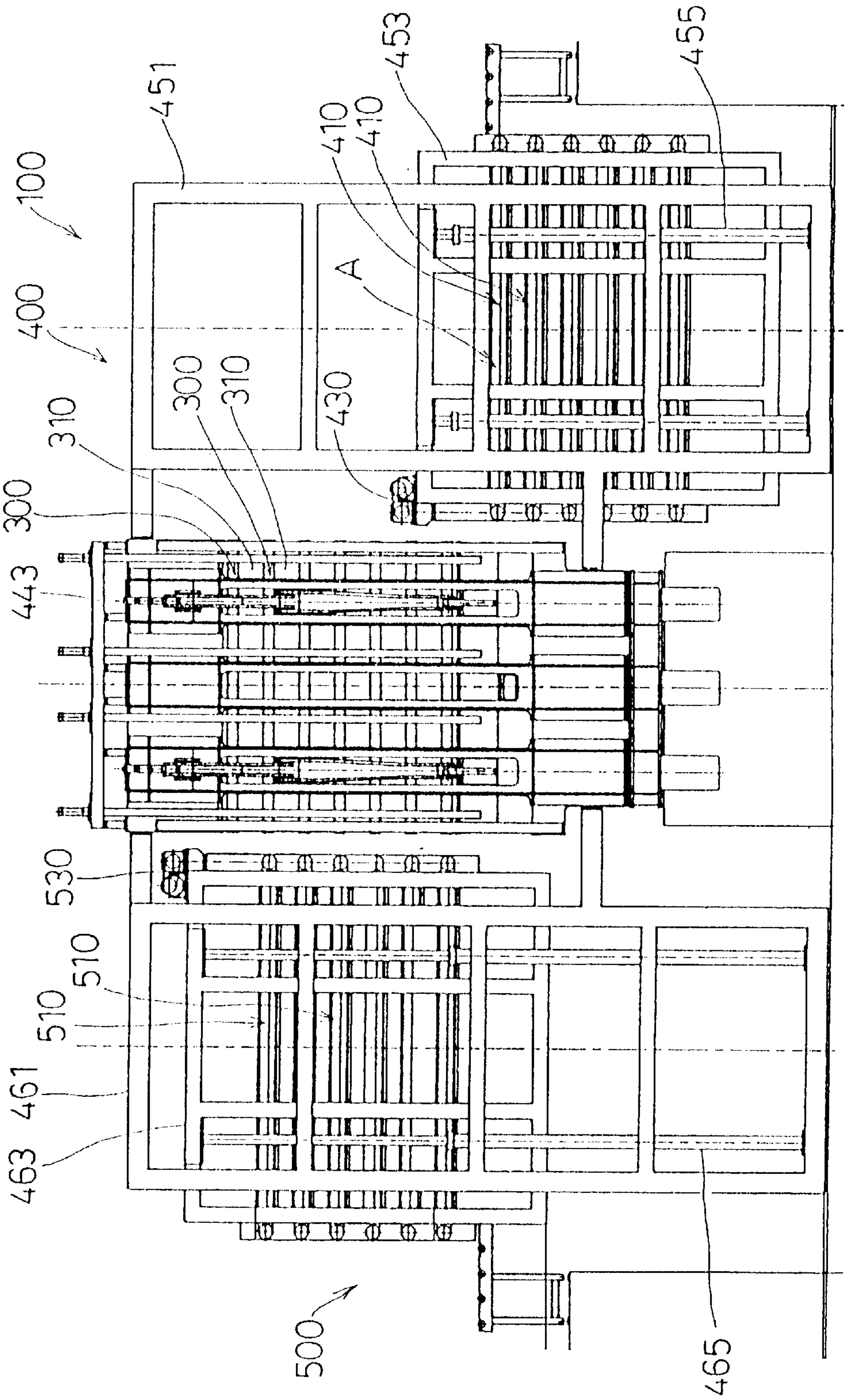
FIG. 13 is a front view showing the overall structure of a hot pressing apparatus embodying the invention.
Figure 14:
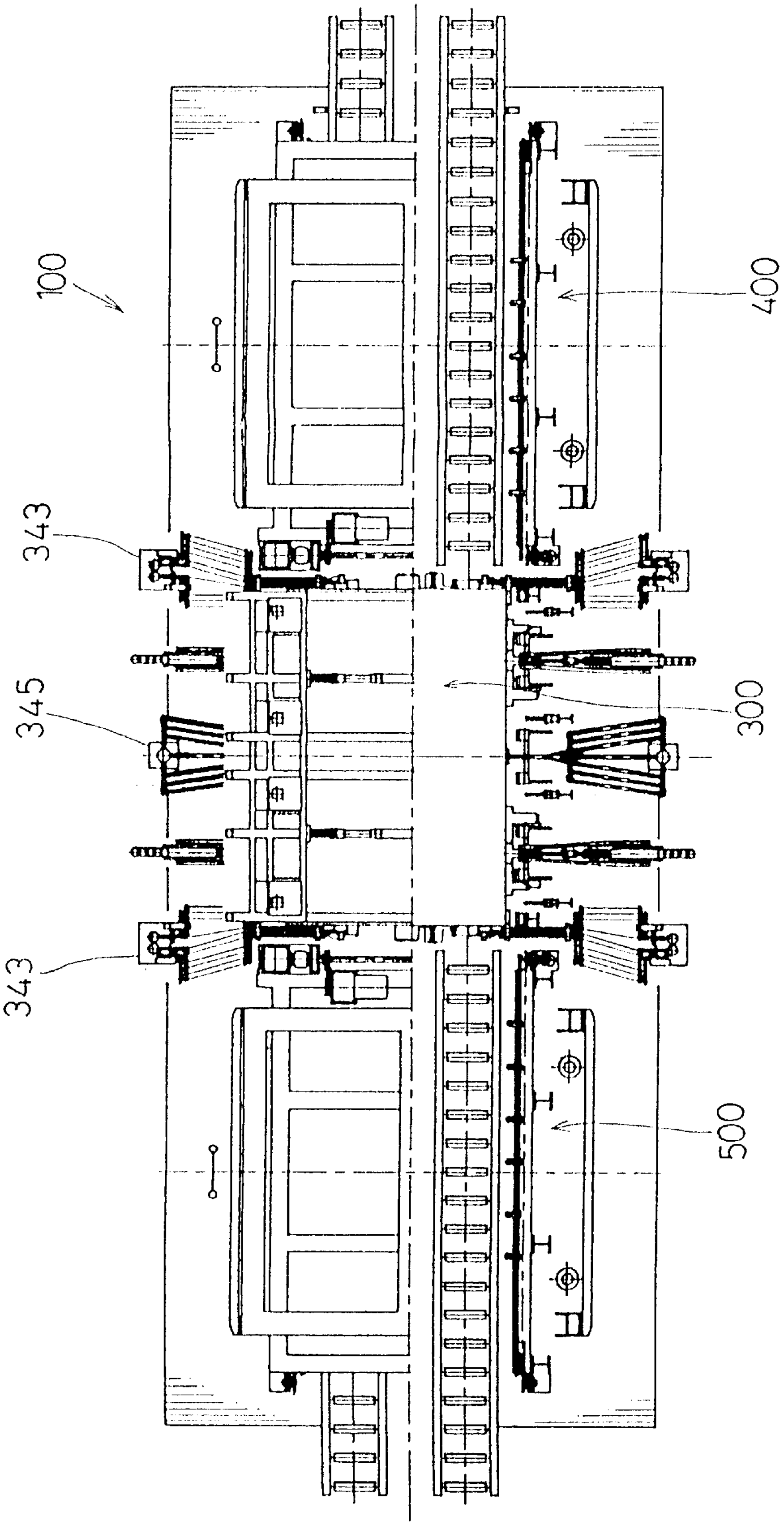
FIG. 14 is a plan view showing the overall structure of the hot pressing apparatus embodying the invention.

FIGS. 13 and 14 show the overall structure of the hot pressing apparatus 100 according to the embodiment. Parts that are the same as those of the foregoing embodiments are given like reference numbers and their description will not be repeated.

The hot pressing apparatus 100 comprises centrally disposed hot pressing mechanisms 300, and also a conveying and setting mechanism 400 and a board take-out mechanism 500 disposed on the opposite sides of the hot pressing mechanism 300, respectively.

The conveying and setting mechanism 400 includes conveying members 410 which have a vertical multiple stage arrangement accommodated in a multiple stage cage 453. The multiple stage cage 453 can be raised and lowered by cylinders 455 in and along a frame 451.

In this embodiment, the hot pressing mechanisms 300 have a vertical six-stage arrangement constituted by six hot pressing sections 310 conforming to the conveying members 410. As shown in FIG. 14, an aggregate tubing 343 for steam injection and another aggregate tubing 345 for hot plate heating, are connected to the hot pressing mechanisms 300. The steam injection aggregate tubing 343 is provided for supplying steam to steam supply ports 350 to be described later. The hot plate heating aggregate tubing 345 is for heating hot plates 320 to be described later. The heating may be done by selecting a desired method, such as heating with steam and electric heating.

As shown in FIG. 13, the board take-out mechanism 500 has a vertical six-stage arrangement disposed in a multiple stage board take-out cage 463. The multiple board take-out cage 463 can be raised and lowered by cylinders 465 in and along a frame 461.

Boards to be hot pressed are set in a multiple stage arrangement in the conveying members 410 provided in the multiple stage cage 453 shown in FIG. 13. The multiple stage cage 453 can be raised and lowered by the cylinders 455, and in its lower set position, the boards are set in the conveying member 410 by the operator.

Figure 15:
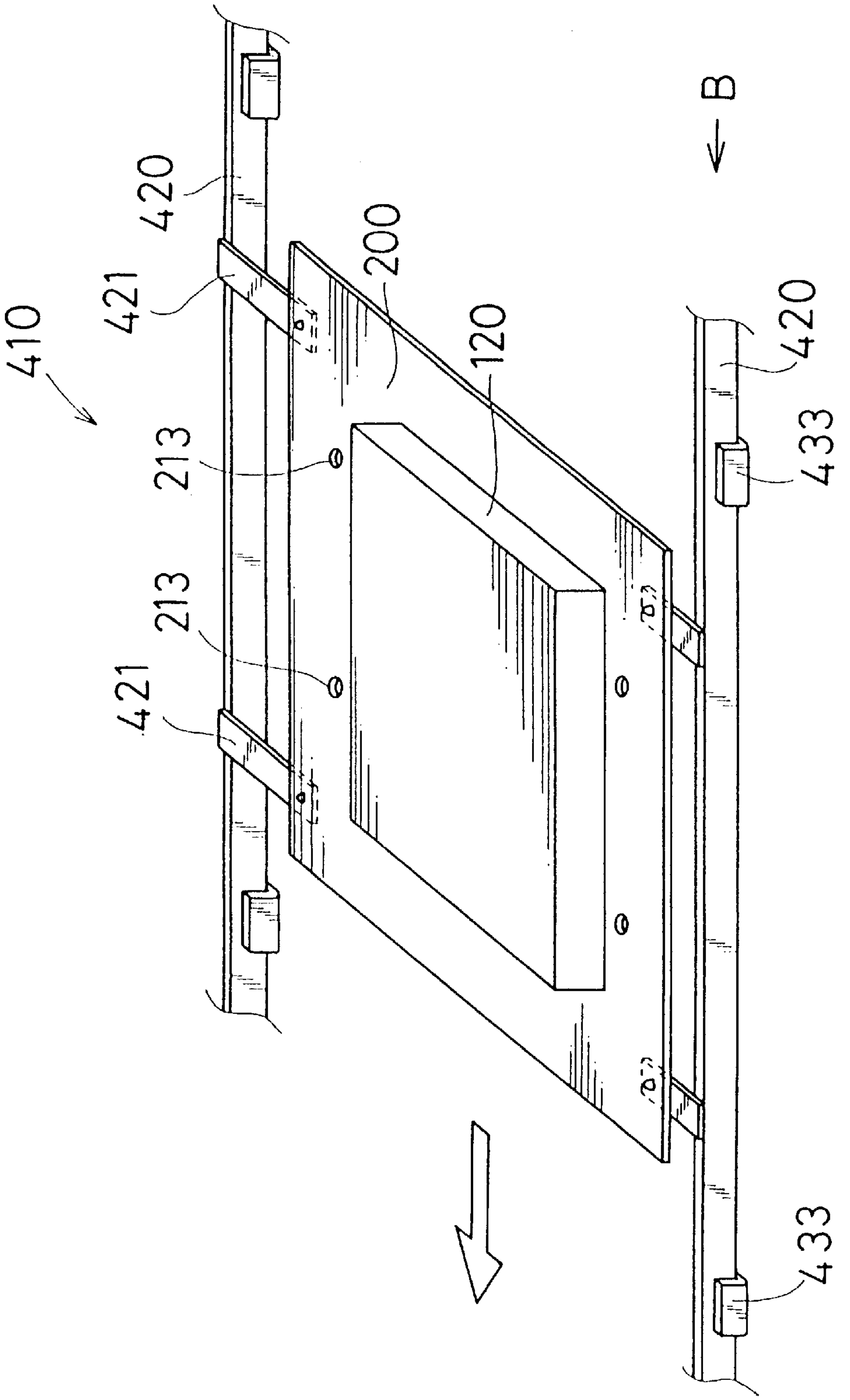
FIG. 15 is a view taken in the direction of arrow A in FIG. 13, illustrating the setting of a board.
Figure 16:
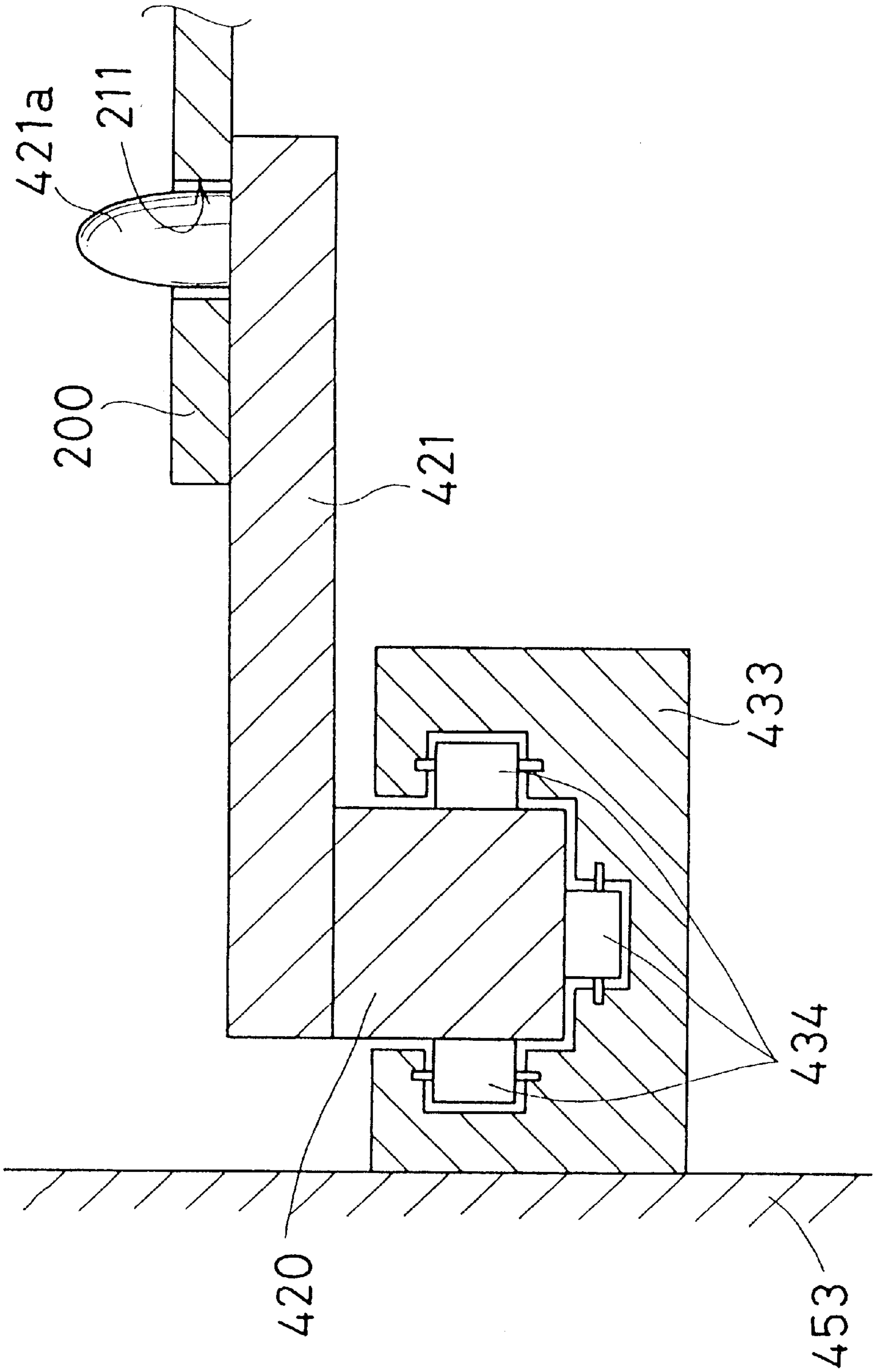
FIG. 16 is a view taken in the direction of arrow B in FIG. 15.

Referring to FIG. 15 which is taken in the direction of arrow A in FIG. 13, each board 120 is put on the caul plate 200 which is supported by the caul plate support members 421 on the rails 420 of each conveying member 410. The rails 420 is supported for advancement and retreat to the left and right as viewed in FIG. 15 by support members 433 provided on the multiple stage cage 453 (see FIG. 13). As shown in FIG. 16 which is a sectional view taken in the direction of arrow B in FIG. 15, the rails 420 are supported for advancement and retreat by rollers 434 provided in the support members 433 which are in turn secured to the multiple stage cage 453. The rails 420 support the caul plate 200 in a manner secured to them by the engagement of projections 421*a*, which project from the caul plate support members 421 provided on the rails 420, in caul plate support member engagement holes 211.

After the boards 120 have been set in the conveying members 410, the multiple stage cage 453 is raised by the cylinders 455 along the frame 451. The caul plates 200 with the boards 120 put thereon are conveyed to the hot pressing sections 310 for hot pressing.

The conveying is done by drive mechanism 430 having a motor and chains (as described before in detail in connection with the previous embodiments and not described here in detail).

Figure 17:
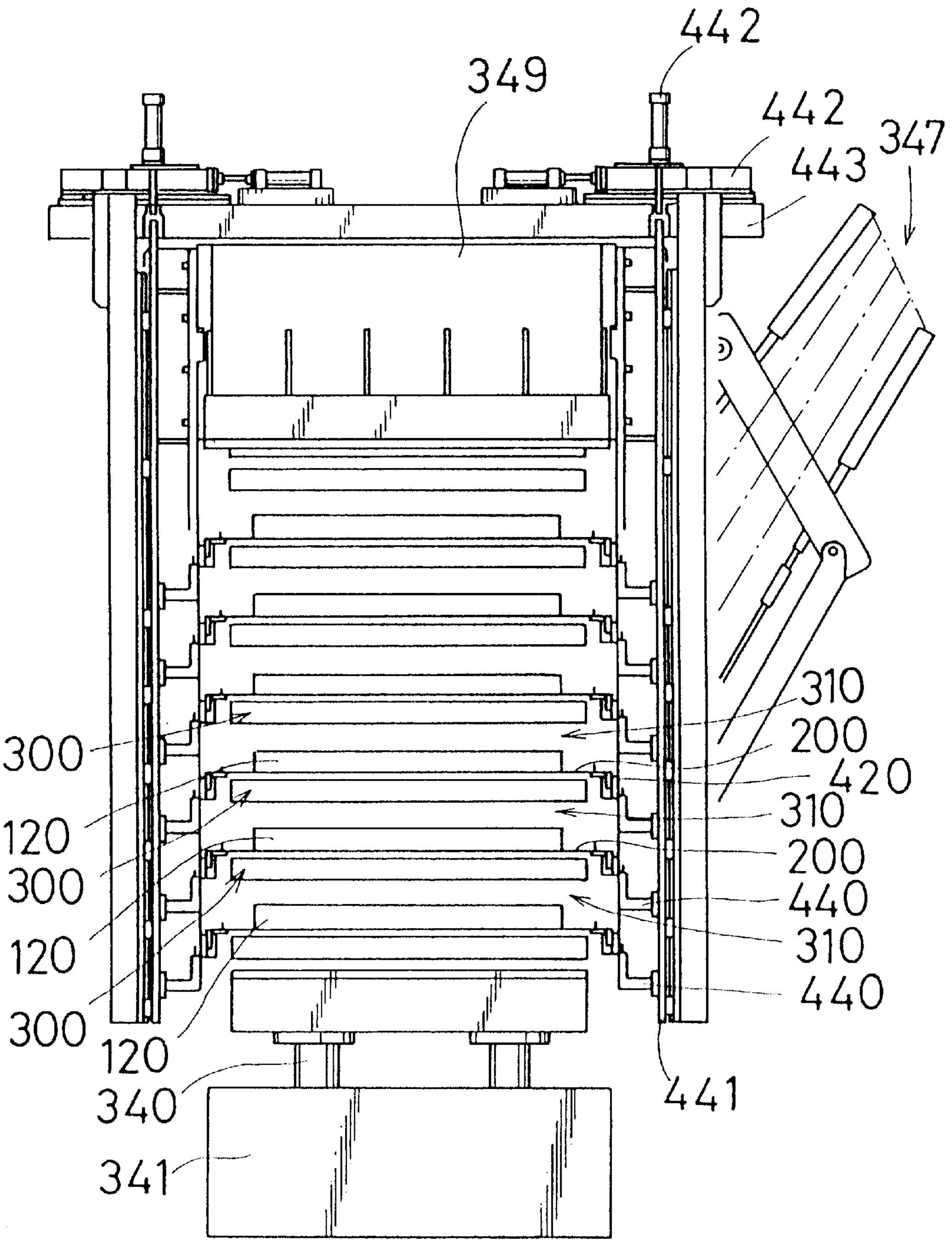
FIG. 17 is a front view showing a hot pressing section.

FIG. 17 shows the state of the boards 120 and caul plates 200 conveyed to the hot pressing sections 310.

In each hot pressing section 310, the caul plate 200 with the board 120 put thereon is supported on the rails 420 such that it is aloft from the hot pressing mechanism 300.

The setting members 440 mounted on supports 441 are provided on the opposite sides of the hot pressing sections 310. The supports 441 and the setting members 440 mounted thereon are movable to the left and right and also in vertical directions (as viewed in FIG. 17) relative to a base 443 by cylinders 442. A simultaneous closing unit 347 is provided on one side of the hot pressing sections 310 to facilitate the hot pressing operation. This technique is, however, well known at the time of the present application, and therefore it is not described in detail.

The caul plates 200 with the boards 120 put thereon are subjected to hot pressing operation by cylinders 340 which can be raised and lowered by a lift unit 341. The hot pressing operation will be described later in detail. A steam jet pressure reducing hot pressing unit 349 is provided above the hot pressing sections 310.

Figure 18A:
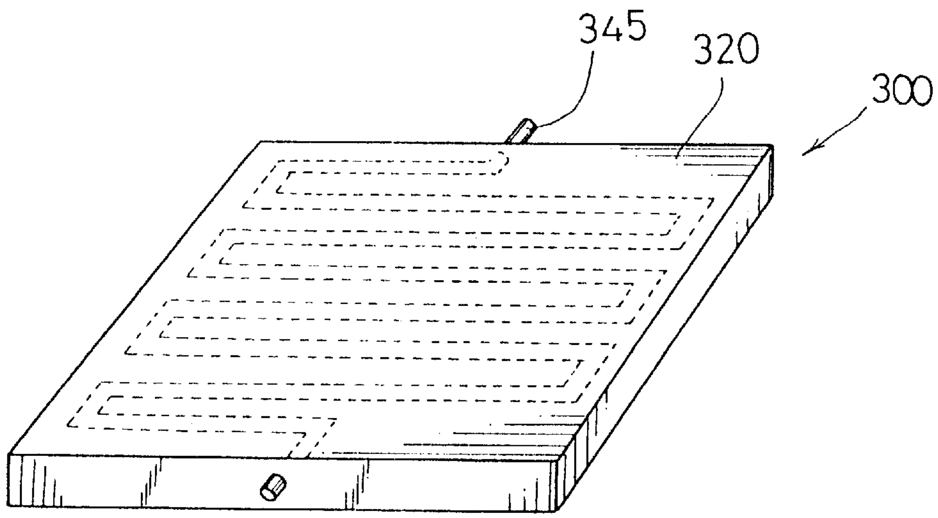
FIGS. 18(*a*) and 18(*b*) are views showing hot pressing mechanism.
Figure 18B:
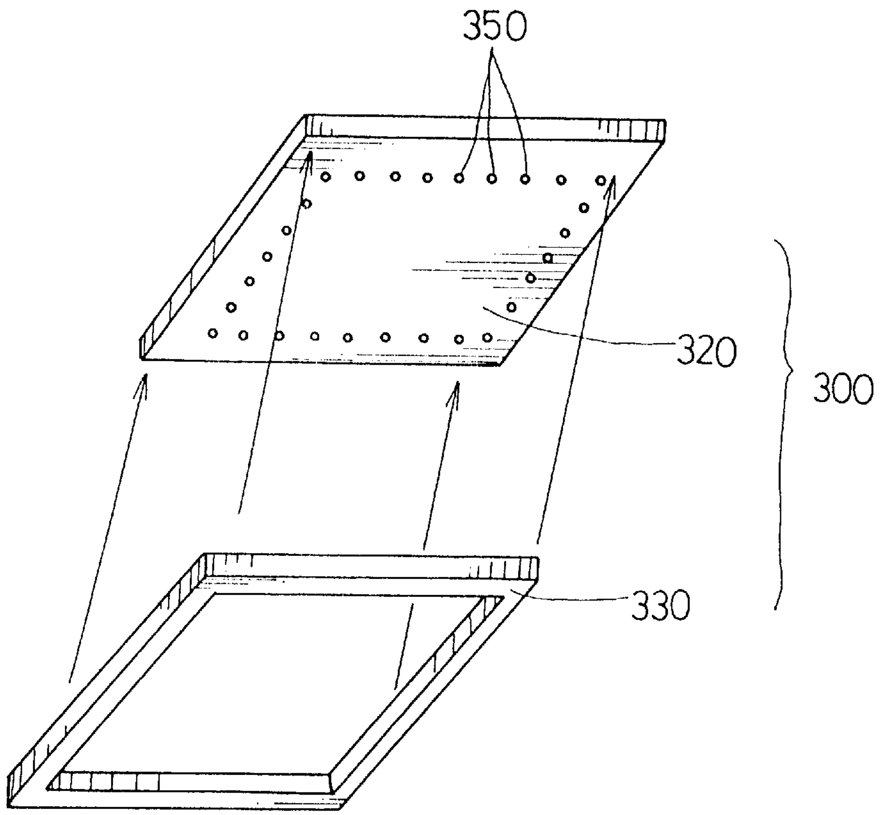

FIGS. 18(*a*) and 18(*b*) show the structure of the hot pressing mechanism 300 in detail.

The hot pressing mechanism 300 has the hot plate 320 for hot pressing a board and the spacer 330 projecting from the edge of the hot plate 320.

As shown in FIG. 18(*a*), the hot plate 320 is heated by the aggregate tubing 345 (see FIG. 14) for hot pressing in the hot pressing operation. The heating is done using steam, for instance. The heating temperature is preferably 50 to 250° C.

As shown in FIG. 18(*b*), the hot plate 320 has steam supply ports 350 through which steam supplied from the aggregate tubing 343 (see FIG. 14) for steam injection is supplied. A plurality of the steam supply ports 350 are provided on the inner side of the mounting position of the spacer 330 on the hot plate 320.

The operations of conveying the board to the hot pressing section and hot pressing the board therein will now be described with reference to FIGS. 19 to 23 and 24(*a*) and 24(*b*).

Figure 19:
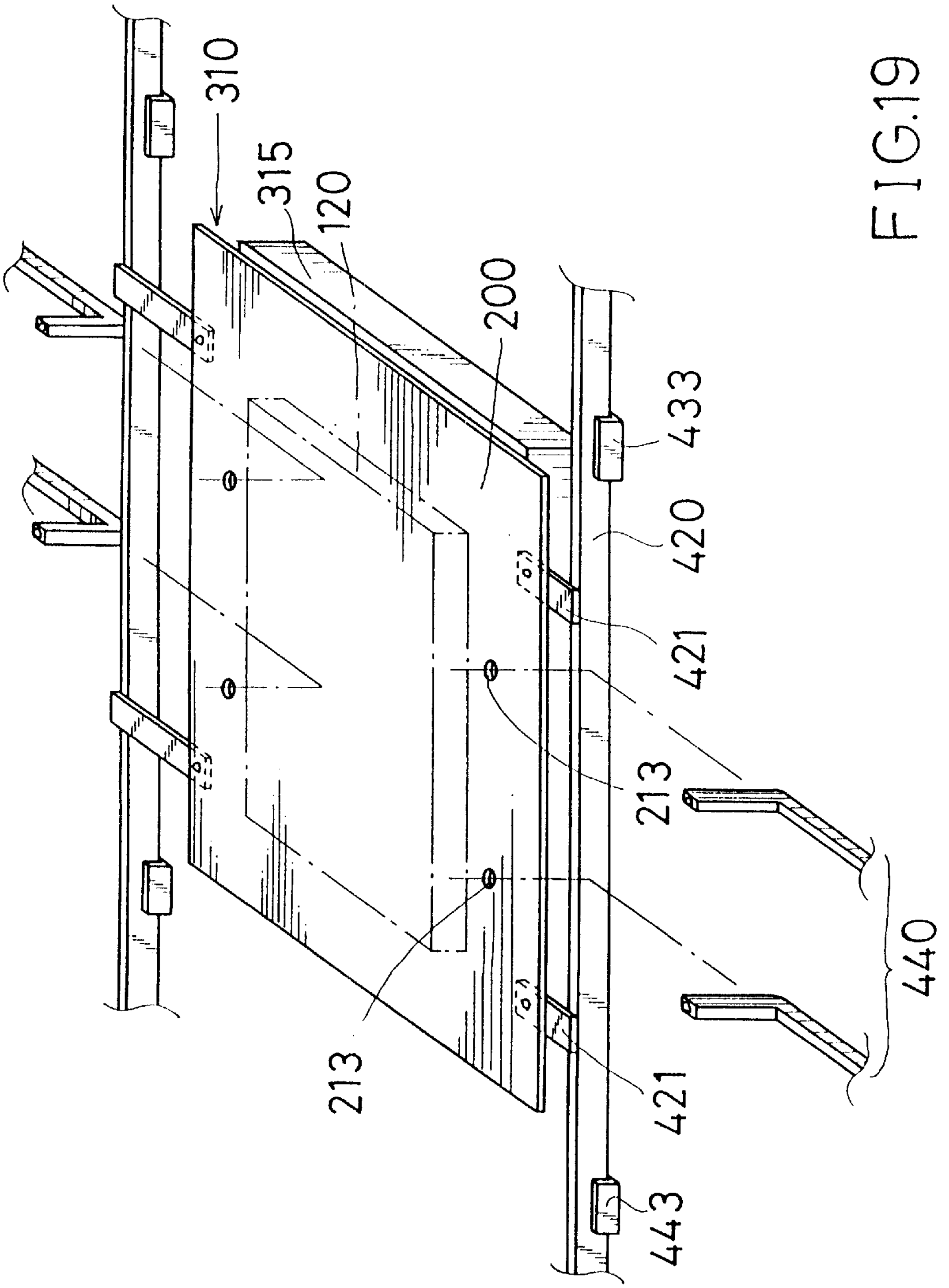
FIG. 19 is a view illustrating the conveying and setting of a board.

As shown in FIG. 19, the caul plate 200 with the board 120 put thereon is supported on the rails 420 such that it is held aloft therefrom by the caul plate support members 421 and the caul plate 200 is conveyed to the hot pressing section 310 in a state free from frictional contact with any other member.

In the hot pressing section 310, the rails 420 are supported by the support members 433 above the predetermined hot pressing position 315.

Subsequently, the setting member 440 provided on a support (not shown) is moved toward the hot pressing section 310 such that it passes through the underside of the rails 420, and is then raised into engagement in setting member engagement holes 213 formed in the caul plate 200.

Figure 20:
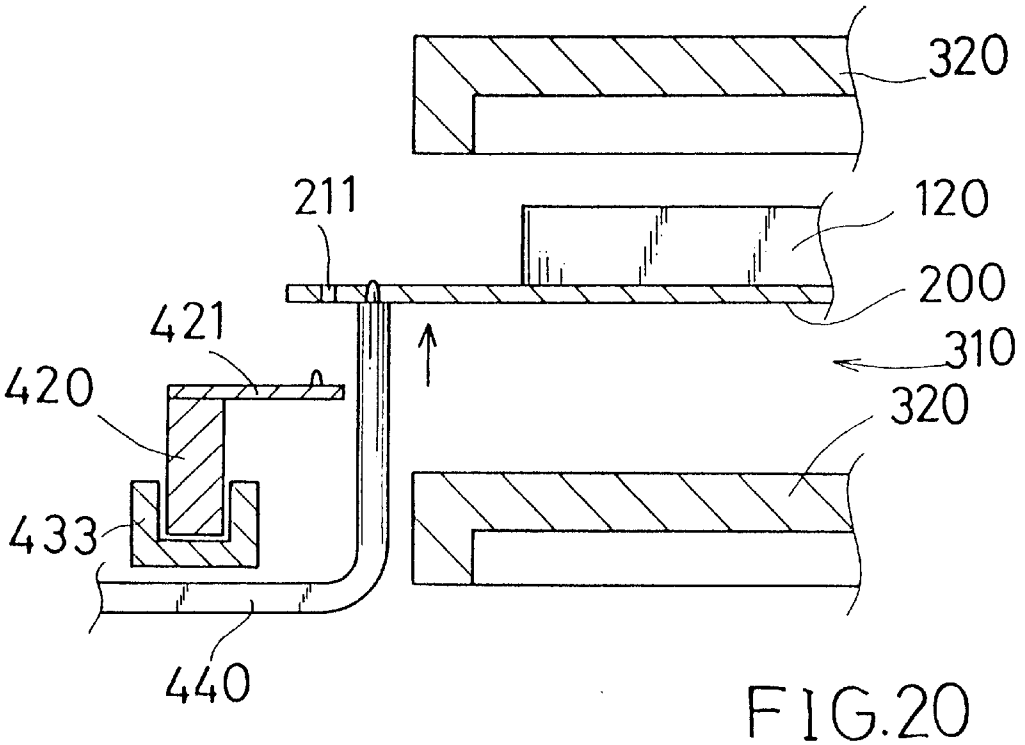
FIG. 20 is a view also illustrating the conveying and setting of the board.

As shown in FIG. 20, the setting member 440 is further raised in the hot pressing section 310 in a range in which the board 120 is not brought into contact with the hot plate 320 located above the board 120. At this time, the caul plate 200 is raised to a position at a higher level than the caul plate support members 421 provided on the rails 420, and is thus released from support of the rails 420 (i.e., caul plate support members 421).

Figure 21:
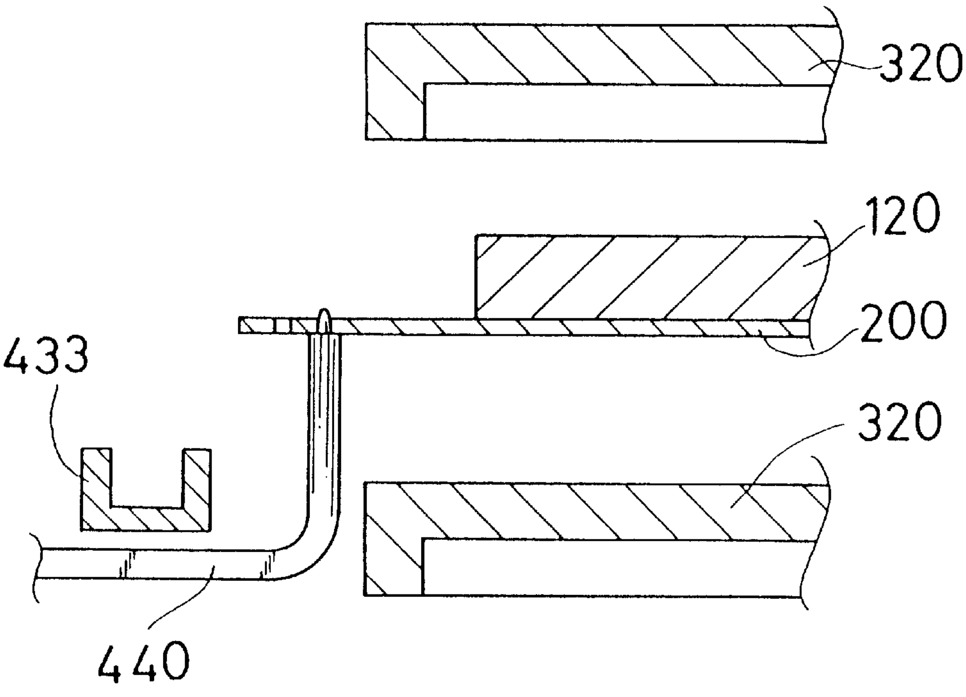
FIG. 21 is a view further illustrating the conveying and setting of the board.
Figure 22:
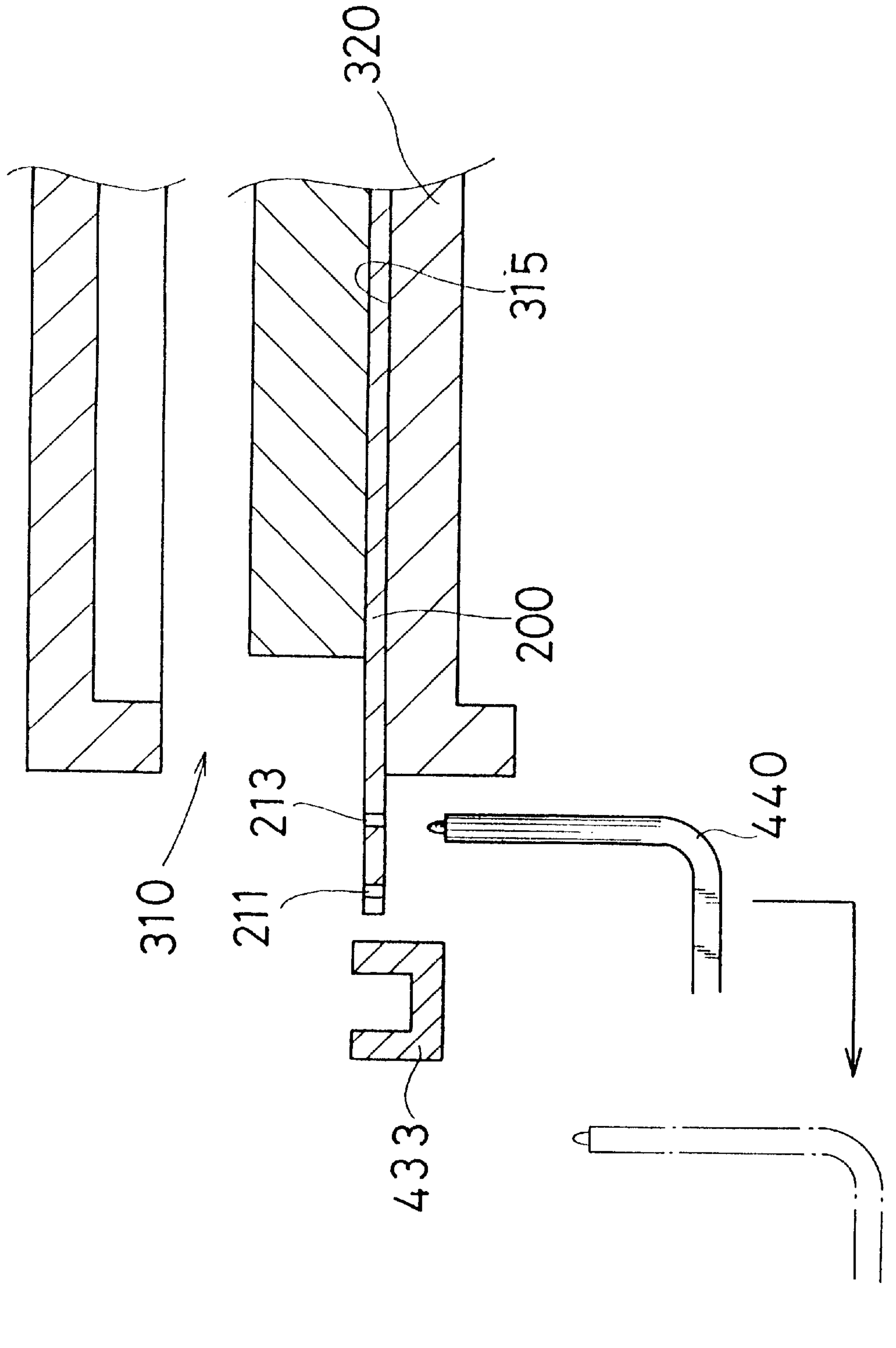
FIG. 22 is a view still further illustrating the conveying and setting of the board.
Figure 23:
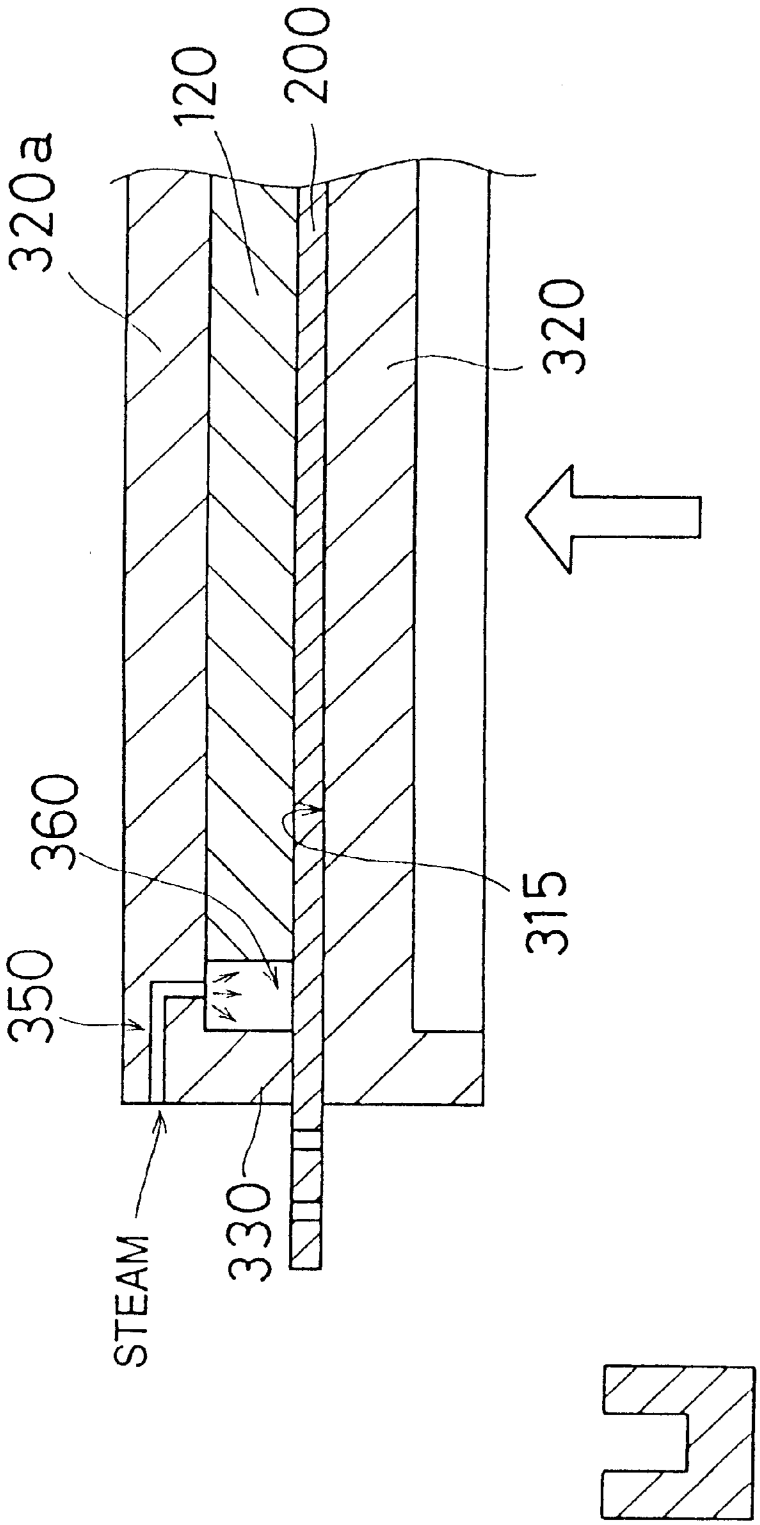
FIG. 23 is a view yet further illustrating the conveying and setting of the board.

As shown in FIG. 21, the rails 420 released from support of the caul plate 200 is then retreated. The retreat is made by moving the rails 420 by the drive mechanism 430 shown in FIG. 13 toward the multiple stage cage 453 (see FIG. 13).

As shown in FIG., 22, the setting member 440 is then lowered to set the caul plate 200 with the board 120 put thereon in the predetermined hot pressing position 315. The hot pressing position 315 is constituted by the top surface of the hot plate 320 for hot pressing a lower stage board (not shown). The setting member 440 is further lowered and thus released from the setting member engagement holes 213, and then retreated from the hot pressing section 310 such that it passes through the underside of the support members 433 (i.e., to the left as viewed in FIG. 22).

Subsequently, the hot plate 320 with the caul plate 200 put thereon is raised toward the upper stage hot plate 320*a* with the operation of the cylinders 340 by the lifting unit 341 shown in FIG. 17. Consequently, the board 120 is hot pressed in the closed space which is defined by the hot plate 320*a,* the spacer 330 and the caul plate 200 (see FIG. 23).

In this operation, the extent of hot pressing of the board 120 is controlled by the spacer 330. The extent of pressing can be suitably adjusted by the extent of projection of the spacer 330. The hot pressing operation is promoted by steam supplied from the steam support ports 350 formed in the spacer 350. The steam supplied is preferably under pressures of 1 to 10 kg/cm$^2$ and at temperatures of 50 to 540° C. It is possible to use an inert gas or the like in lieu of the steam.

Figure 24B:
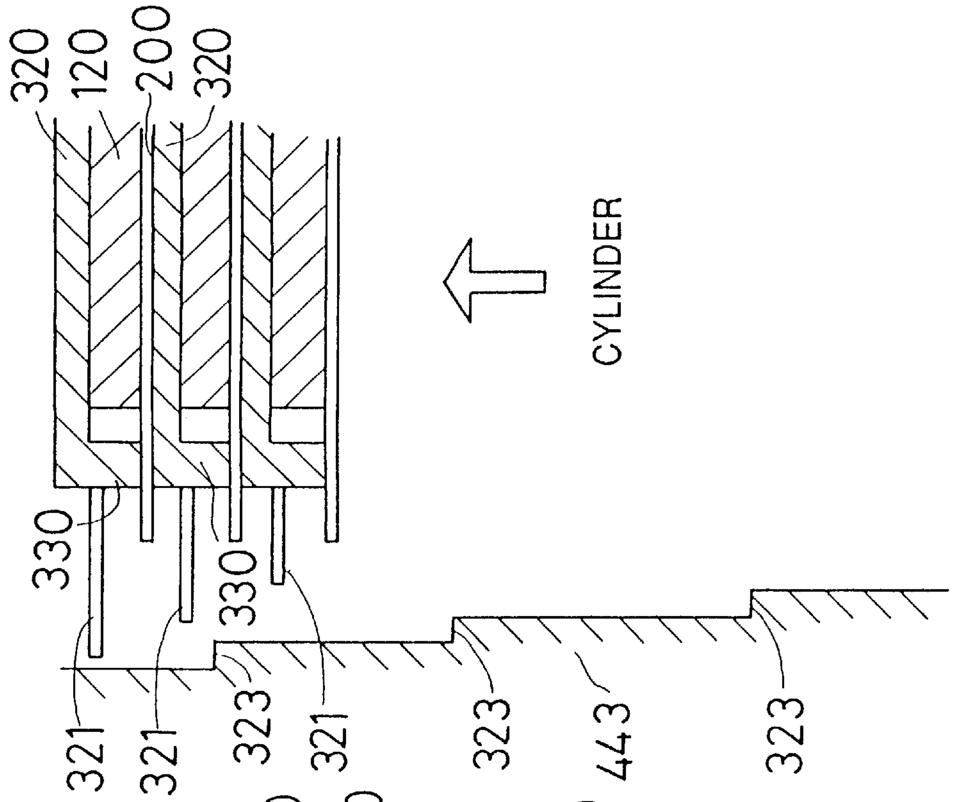
FIGS. 24(*a*) and 24(*b*) are views illustrating the raising of a hot plate.
Figure 24A:
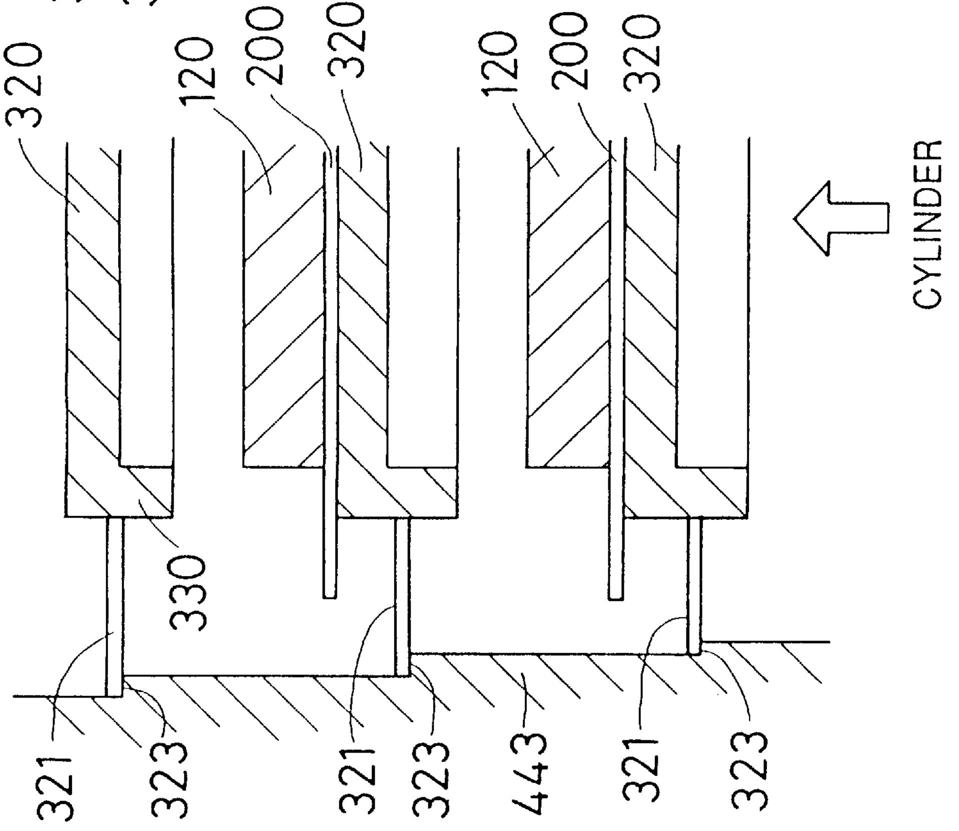
Figure 25:
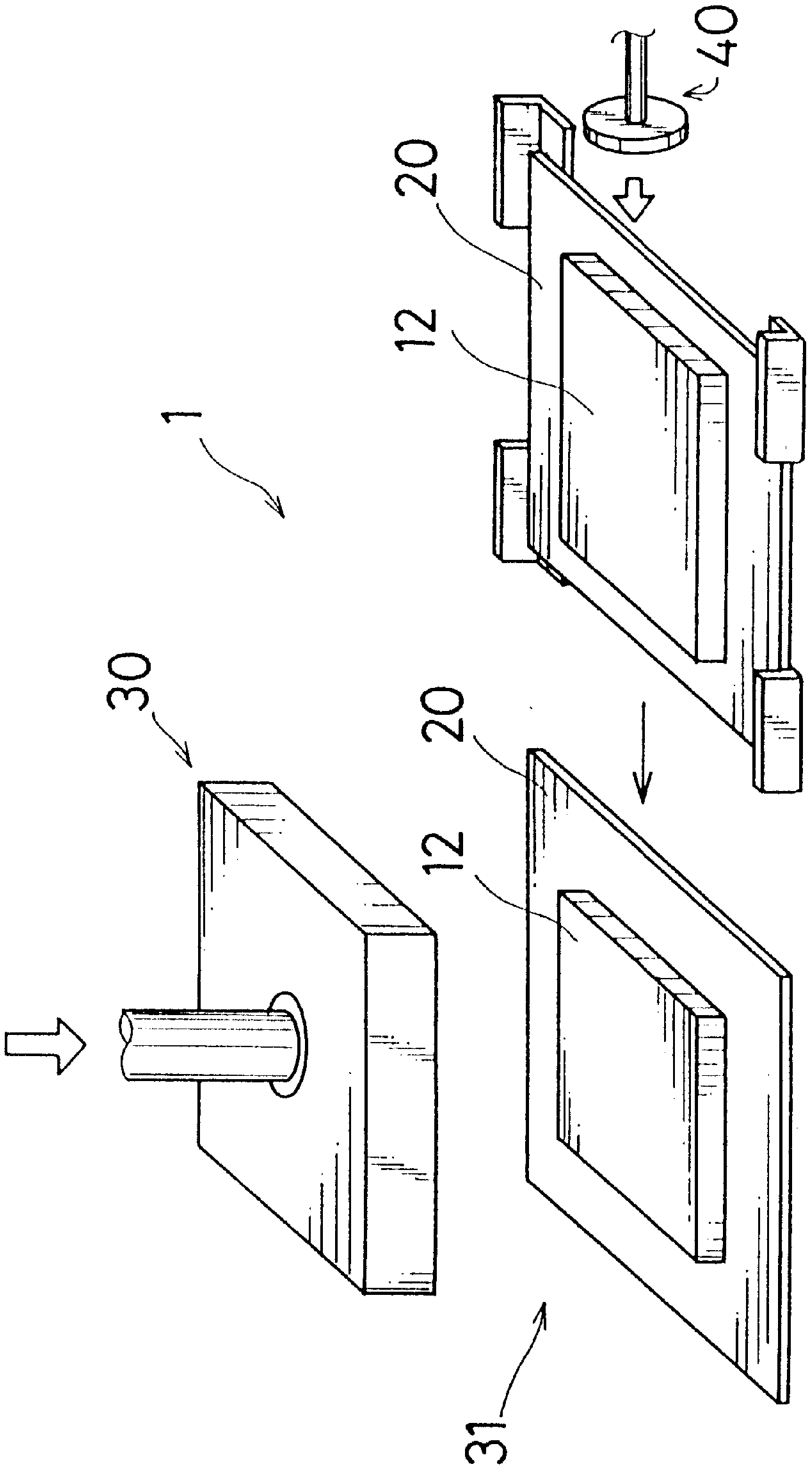
FIG.25 PRIOR ART
FIG. 25 is a view illustrating a prior art process of hot pressing a board.
Figure 26:
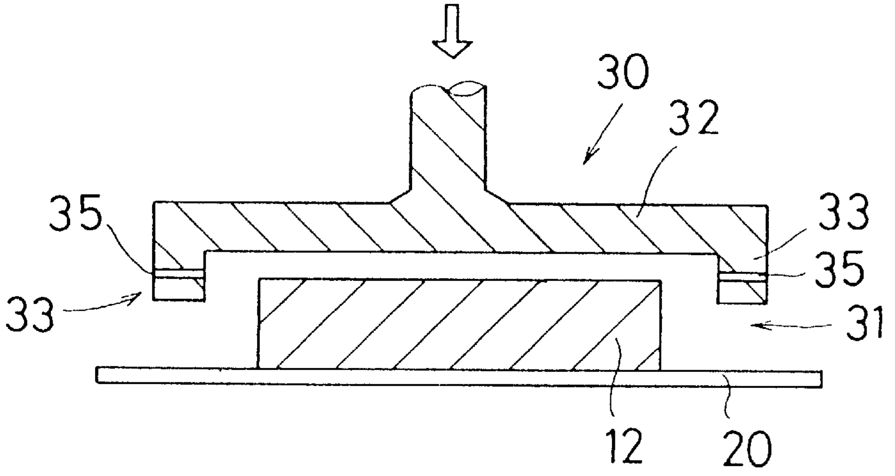
FIG. 26 PRIOR ART
FIG. 26 is a view also illustrating the prior art process of hot pressing the board.
Figure 27:
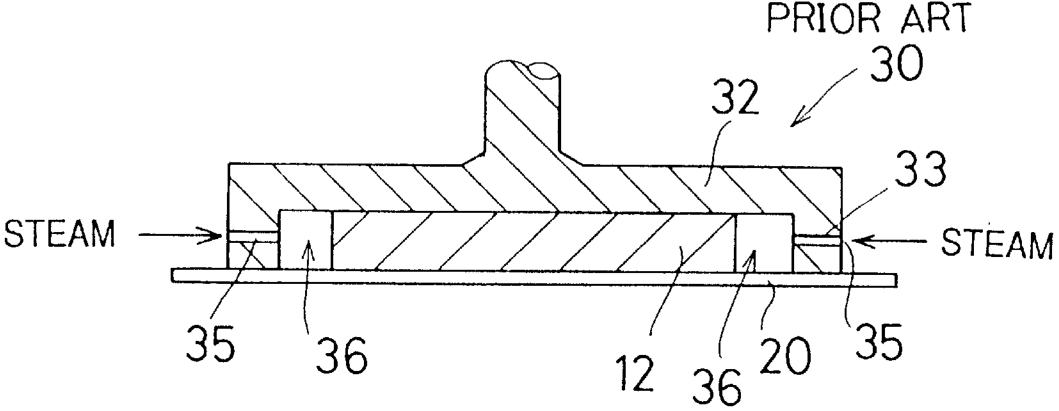
FIG. 27 PRIOR ART
FIG. 27 is a view further illustrating the prior art process of hot pressing the board.

The operation of the lifting unit 341 shown in FIG. 17 to raise the hot plate 320 will now be described in detail. As shown in FIG. 24(*a*), normally the hot plates 320 are each supported on each shoulder 323 of the base 443 by the hot plate support members 321, and with cylinder operation, they are successively raised apart from their respective shoulders 323 from the lowermost one of them. The shoulders 323 are wider than lower stage ones of them, and thus interference by the hot plate support members 321 can be prevented. As shown in FIG. 24(*b*), hot pressing is brought about with each caul plate 200 clamped via the spacer 330 thereof between adjacent hot plates 320.

When the hot pressing operation is completed, the hot plates 320 are lowered by operating the cylinders. Thus, the hot plate support members 321 are successively brought into contact again with their associated shoulders 323, thus restoring the state shown in FIG. 24(*a*).

As shown in FIG. 13, the boards 120 having been hot pressed are taken out by the board take-out mechanism 510 driven by the drive mechanism 530 and are conveyed to the multiple stage cage 463. The multiple stage cage 463 is then lowered by the cylinders 465 along the multiple stage board take-out frame 461. In this way, the hot pressed boards are taken out.

The board take-out mechanism 510 and the drive mechanism 530 substantially have the same structure as the conveying member 410 and the drive mechanism 430 used for driving the conveying member 410, and they are not described in detail.

While the invention has been described with reference to preferred embodiments thereof, it is to be understood that modifications or variations may be easily made without departing from the scope of the present invention which is defined in the appended claims.

What is claimed is:

1. A process of hot pressing boards comprising the steps of:

putting a board on a caul plate; carrying out a board conveying step for conveying the board on the caul plate to a hot pressing section and setting the board on the caul plate in a predetermined hot pressing position therein; and hot pressing the board in the hot pressing section with hot pressing means;

the hot pressing means including a hot plate for hot pressing the board in the predetermined hot pressing position, and a spacer configured to project from the hot plate and capable of adjusting pressing of the board, the board being hot pressed in a closed space defined by the hot plate, the caul plate and the spacer;

the caul plate in the board conveying step being supported, in a state free from frictional contact with any other member, by a conveying and setting means which is advanced and retreated into and out of the hot pressing section, said advancing while the caul plate is conveyed to the hot pressing section, and set in the hot pressing position in the hot pressing section by the conveying and setting means, and the conveying and setting means is thereafter retreating to a position free from interference with the hot pressing operation;

wherein the conveying and setting means includes a conveying member and a setting member;

the caul plate in the board conveying step is supported in a state free from frictional contact with any other member by the conveying member and supported by the setting member in succession to the conveying member in the hot pressing section, and set in the predetermined hot pressing position in the hot pressing section by the setting member after the conveying member has been retreated to a position free from interference with hot pressing operation, the board being hot pressed after the setting member has been retreated to a position free from interference with the hot pressing operation;

wherein the caul plate supporting the board having been hot pressed is supported by the setting member in the hot pressing section, and is subsequently supported by board take-out means which is advanced and retreated between the hot pressing section and the outside thereof in succession to the setting member to be conveyed in a state free from frictional contact with any other member to the outside of the hot pressing section; and wherein the board is continuously supported by the caul plate during the conveying step, the setting step, the hot pressing step and the take-out step.

2. The process of hot pressing boards according to claim 1, wherein:

the conveying member has rails for supporting the caul plate thereabove in a state free from frictional contact with any other member, and drive means for causing advancement and retreat of the rails between the hot pressing section and the outside thereof; and the setting member can release the caul plate from the rails in the hot pressing section by raising the caul plate from the rails, set the caul plate in the hot pressing position in the hot pressing section by lowering the caul plate after the rails without any supported caul plate has been retreated by the drive means to a position free from interference with the hot pressing operation, and be retreated to a position free from interference with the hot pressing operation after the setting of the caul plate in the hot pressing position.

3. The process of hot pressing boards according to claim 2 wherein said rails are advanced into and withdrawn from the hot pressing section along a straight path, and wherein said setting member moves vertically and horizontally within a plane substantially perpendicular to the path of the rails, thereby avoiding interference with the rails during the setting operation.

4. The process of hot pressing boards according to claim 1 wherein:

each of said conveying member and said setting member supports the board from a lower side while the board is free to move upwardly.

5. The process of hot pressing boards according to claim 4 wherein the caul plate is supported by the conveying member with a plurality of first pins of the conveying member inserted into first holes formed in the caul plate, and the caul plate is supported by the setting member with a plurality of second pins of the setting member inserted into second holes formed in the caul plate.

6. The process of hot pressing board according to claim 5, wherein a plurality of the hot pressing means are disposed in a multiple stage arrangement, and wherein a plurality of boards are conveyed to and hot pressed in hot pressing sections at a time.

7. A process of hot pressing boards comprising the steps of:

a) setting a plurality of boards in a multiple stage cage by placing the boards on caul plates that are supported by a plurality of conveying members of the multiple stage cage;

b) moving the conveying members into a hot pressing section that includes a plurality of hot plates spaced from each other in a vertical direction while the caul plates are free from contact with members other than the conveying members, whereby each of the caul plates with boards thereon and each of the conveying members is positioned in a vertically spaced relationship with the corresponding hot plate;

c) moving setting members horizontally and vertically while the caul plates are free from contact with members other than the conveying members, whereby the setting members move into the hot pressing section and raise the caul plates with boards from the corresponding conveying members so as to release the support of the caul plates by the conveying members;

d) withdrawing the conveying members from the hot pressing section;

e) moving the setting members to lower the caul plates on the corresponding hot plates so as to release the support of the caul plates by the setting members, and withdrawing the setting members from the hot pressing section;

f) moving the hot plates in the vertical direction so as to clamp each of the boards between the corresponding two hot plates;

g) hot pressing the boards as clamped in the step f); then h) moving the hot plates to their original unclamped positions; then i) moving the setting members into the hot pressing section so as to support the caul plates with hot pressed boards disposed above the corresponding hot plates; and j) moving board take-out members into and out of the hot pressing section so as to take out the cauls with hot pressed boards from the setting members while the cauls are free from contact with members other than the board take-out members.

8. The process according to claim 7 wherein the hot plates are supported in the hot press section by means of shoulders, each of the shoulders has a greater width than those shoulders positioned at a lower stage, and wherein said step f) is performed by lifting the lowermost hot plate, so that the hot plates are successively raised apart from their respective shoulders from the lowermost one and are brought into contact with the caul plates positioned vertically thereof.

9. The process according to claim 7 wherein said step a) is performed when the multiple stage cage is in a first position in a vertical direction, and wherein said step b) is performed when the multiple stage cage is in a second position above the first position.

10. The process according to claim 7 wherein said conveying members are advanced into and withdrawn from the hot pressing section along straight paths, and wherein each of said setting members move vertically and horizontally within a plane substantially perpendicular to the path of the corresponding conveying member, thereby avoiding interference with the corresponding conveying member during the setting operation.

* * * * *